United States Patent
Dai et al.

(10) Patent No.: US 12,463,786 B2
(45) Date of Patent: Nov. 4, 2025

(54) BANDWIDTH PART (BWP) PARTITION AND SUB-BWP HOPPING

(71) Applicant: QUALCOMM Incorporated, San Diego, CA (US)

(72) Inventors: Jing Dai, Beijing (CN); Chao Wei, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/800,984

(22) PCT Filed: Feb. 28, 2020

(86) PCT No.: PCT/CN2020/077179
§ 371 (c)(1),
(2) Date: Aug. 19, 2022

(87) PCT Pub. No.: WO2021/168789
PCT Pub. Date: Sep. 2, 2021

(65) Prior Publication Data
US 2023/0072549 A1    Mar. 9, 2023

(51) Int. Cl.
*H04L 5/00* (2006.01)
(52) U.S. Cl.
CPC .......... *H04L 5/0092* (2013.01); *H04L 5/0012* (2013.01); *H04L 5/0051* (2013.01)
(58) Field of Classification Search
None
See application file for complete search history.

(56) References Cited

U.S. PATENT DOCUMENTS

| | | | |
|---|---|---|---|
| 2019/0132109 A1* | 5/2019 | Zhou | ........................ H04L 5/001 |
| 2019/0141546 A1 | 5/2019 | Zhou et al. | |
| 2019/0223086 A1 | 7/2019 | Jung et al. | |

FOREIGN PATENT DOCUMENTS

WO    WO-2020087470 A1 *    5/2020

OTHER PUBLICATIONS

Machine Translation of WO-2020087470-A1 (Year: 2020).*
(Continued)

*Primary Examiner* — Angela Nguyen
(74) *Attorney, Agent, or Firm* — Loza & Loza, LLP

(57) ABSTRACT

Aspects of the disclosure relate to defining a bandwidth part (BWP) within an operating bandwidth, and sub-BWPs within the BWP, where the sub-BWPs can be used for scheduling frequency-hopping transmissions. As one example, a base station may schedule frequency-hopping transmissions using two or more sub-BWPs. The base station may configure a portion of an operating bandwidth to serve as a BWP used for communicating with a UE over the wireless communication network, define two or more sub-BWPs at different frequency locations within the BWP, each sub-BWP including resource blocks provided in the BWP, and provide a scheduling gap when a frequency hop is scheduled between two or more sub-BWPs at the UE, wherein the scheduling gap accommodates radio frequency retuning at the UE.

19 Claims, 15 Drawing Sheets

(56) References Cited

OTHER PUBLICATIONS

Intel Corporation: "Layer 1 Enhancements for eURLLC", 3GPP Draft; R1-1810785, 3GPP TSG RAN WG1 Meeting #94b, Intel-Eurllc L1 Enhancements Final, 3rd Generation Partnership Project (3GPP), Mobile Competence Centre ; 650, Route Des Lucioles ; F-06921 Sophia-Antipolis Cedex; France, vol. RAN WG1, No. Chengdu, China; Oct. 8, 2018-Oct. 12, 2018, Sep. 29, 2018 (Sep. 29, 2018), XP051518190, 12 Pages, Retrieved from the Internet: URL:http://www.3gpp.org/ftp/tsg%5Fran/WG1%5FRL1/TSGR1%5F94b/Docs/R1%2D1810785%2Ezip [retrieved on Sep. 29, 2018], PUSCH enhancements; p. 5, paragraph 4—p. 7, The Whole Document.
International Search Report and Written Opinion—PCT/CN2020/077179—ISA/EPO—Nov. 26, 2020.

\* cited by examiner

BANDWIDTH PART (BWP) PARTITION AND SUB-BWP HOPPING

CLAIM OF PRIORITY

This application for patent is the U.S. National Stage of International Patent Application No. PCT/CN2020/077179 filed 28 Feb. 2020, the entire content of which is incorporated herein by reference as if fully set forth below in its entirety and for all applicable purposes.

TECHNICAL FIELD

The technology discussed below relates generally to wireless communication networks, and more particularly, to defining portions of bandwidth parts within an operating bandwidth to be used for scheduling frequency-hopping transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (5G NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable, low-latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to defining a bandwidth part (BWP) within an operating bandwidth, and sub-BWPs within the BWP, where the sub-BWPs can be used for scheduling frequency-hopping transmissions. As one example, a base station may schedule frequency-hopping transmissions using two or more sub-BWPs. The base station may schedule the frequency-hopping transmissions with an intervening scheduling gap that provides time for a receiver to retune radio frequency components, such as an antenna.

In one example, a method for wireless communication at a base station in a wireless communication network is disclosed. The method can include configuring a portion of an operating bandwidth to serve as a bandwidth part (BWP) used for communicating with a user equipment (UE) over the wireless communication network, defining two or more sub-BWPs at different frequency locations within the BWP, each sub-BWP including resource blocks provided in the BWP, and providing a scheduling gap when a frequency hop is scheduled between two or more sub-BWPs at the UE, where the scheduling gap accommodates radio frequency retuning at the UE.

Another example provides a base station in a wireless communication network including a wireless transceiver, a memory, and a processor communicatively coupled to the wireless transceiver and the memory. The processor can be configured to configure a portion of an operating bandwidth to serve as a BWP used for communicating with a UE over the wireless communication network, define two or more sub-BWPs at different frequency locations within the BWP, each sub-BWP including resource blocks provided in the BWP, and provide a scheduling gap when a frequency hop is scheduled between two or more sub-BWPs at the UE, wherein the scheduling gap accommodates radio frequency retuning at the UE.

Another example provides a base station in a wireless communication network. The base station can include means for configuring a portion of an operating bandwidth to serve as a BWP used for communicating with a UE over the wireless communication network, means for defining two or more sub-BWPs at different frequency locations within the BWP, each sub-BWP including resource blocks provided in the BWP, and means for providing a scheduling gap when a frequency hop is scheduled between two or more sub-BWPs at the UE, where the scheduling gap accommodates radio frequency retuning at the UE.

Another example provides a non-transitory computer-readable medium including code for causing a base station to configure a portion of an operating bandwidth to serve as a BWP used for communicating with a UE over the wireless communication network, define two or more sub-BWPs at different frequency locations within the BWP, each sub-BWP including resource blocks provided in the BWP, and provide a scheduling gap when a frequency hop is scheduled between two or more sub-BWPs at the UE, where the scheduling gap accommodates radio frequency retuning at the UE.

Another example provides a method for wireless communication at a UE in a wireless communication network. The method can include configuring a wireless transceiver to communicate using a BWP that includes a portion of an operating bandwidth provided by the wireless communication network, receiving a physical downlink control channel in a first sub-BWP that is located at a first frequency within the BWP and that includes first resource blocks provided in the BWP, retuning one or more radio frequency components of the wireless transceiver from the first frequency to a second frequency within the BWP, and receiving a physical downlink shared channel scheduled by the physical downlink shared channel in a second sub-BWP that is located at the second frequency and that includes second resource blocks provided in the BWP. The one or more components of the radio frequency transceiver may be retuned during a scheduling gap provided between the physical downlink shared channel and the physical downlink shared channel.

Another example provides a UE in a wireless communication network including a wireless transceiver, a memory, and a processor communicatively coupled to the wireless transceiver and the memory. The processor can be configured to configure a wireless transceiver to communicate using a BWP that includes a portion of an operating bandwidth provided by the wireless communication network, receive a physical downlink control channel in a first sub-BWP that is located at a first frequency within the BWP and that includes first resource blocks provided in the BWP, retune one or more radio frequency components of the wireless transceiver from the first frequency to a second frequency within the BWP, and receive a physical downlink shared channel scheduled by the physical downlink shared channel in a second sub-BWP that is located at the second frequency and that includes second resource blocks provided in the BWP. The one or more components of the radio frequency transceiver may be retuned during a scheduling gap provided between the physical downlink shared channel and the physical downlink shared channel.

Another example provides a base station in a wireless communication network. The base station can include means for configuring a wireless transceiver to communicate using a BWP that includes a portion of an operating bandwidth provided by the wireless communication network, means for receiving a plurality of channels from the wireless communication network, configured to receive a physical downlink control channel in a first sub-BWP, and means for retuning one or more radio frequency components of the wireless transceiver from the first frequency to a second frequency within the BWP. The means for receiving the plurality of channels may be configured to receive a physical downlink shared channel scheduled by the physical downlink control channel in a second sub-BWP that is located at the second frequency and that includes second resource blocks provided in the BWP. The one or more components of the radio frequency transceiver are retuned during a scheduling gap provided between the physical downlink control channel and the physical downlink shared channel.

Another example provides a non-transitory computer-readable medium including code for causing a base station to configure a wireless transceiver to communicate using a BWP that includes a portion of an operating bandwidth provided by the wireless communication network, receive a physical downlink control channel in a first sub-BWP that is located at a first frequency within the BWP and that includes first resource blocks provided in the BWP, retune one or more radio frequency components of the wireless transceiver from the first frequency to a second frequency within the BWP, and receive a physical downlink shared channel scheduled by the physical downlink control channel in a second sub-BWP that is located at the second frequency and that includes second resource blocks provided in the BWP. The one or more components of the radio frequency transceiver may be retuned during a scheduling gap provided between the physical downlink control channel and the physical downlink shared channel.

Various method, system, device, and apparatus embodiments may also include additional features. For example, the scheduling gap may be configured as an integer number of symbols or as an integer number of slots. In addition, the may be a reduced capability UE or reduced capability UE.

In some examples, the base station may further be configured to schedule a physical downlink control channel (PDCCH) in a first sub-BWP, and schedule a physical downlink shared channel (PDSCH) in a second sub-BWP that commences after the scheduling gap, wherein the scheduling gap is provided after the PDCCH. The PDSCH may be scheduled to start after transmission of a symbol that carries a demodulation reference signal (DMRS).

In some examples, the base station may further be configured to determine a first number ($N_{RB}^{BWP}$) quantifying resource blocks in the BWP, determine a second number ($N_{RB}^{sub}$) quantifying resource blocks in each sub-BWP, and determine a third number (M) quantifying remaining resource blocks, where $M = N_{RB}^{BWP} \bmod N_{RB}^{sub}$, where M resource blocks located at one or both edges of the BWP are unused. The base station may further be configured to determine a first number ($N_{RB}^{BWP}$) quantifying resource blocks in the BWP, determine a second number ($N_{RB}^{sub}$) quantifying resource blocks in each sub-BWP, and determine a third number (M) quantifying remaining resource blocks, where $M = N_{RB}^{BWP} \bmod N_{RB}^{sub}$, determine a size of at least one sub-BWP located at an edge of the BWP that includes fewer than $N_{RB}^{sub}$ resource blocks when the number of remaining resource blocks equals or exceeds a first threshold number, where M resource blocks located at one or both edges of the BWP are unused when M is less than the first threshold number.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
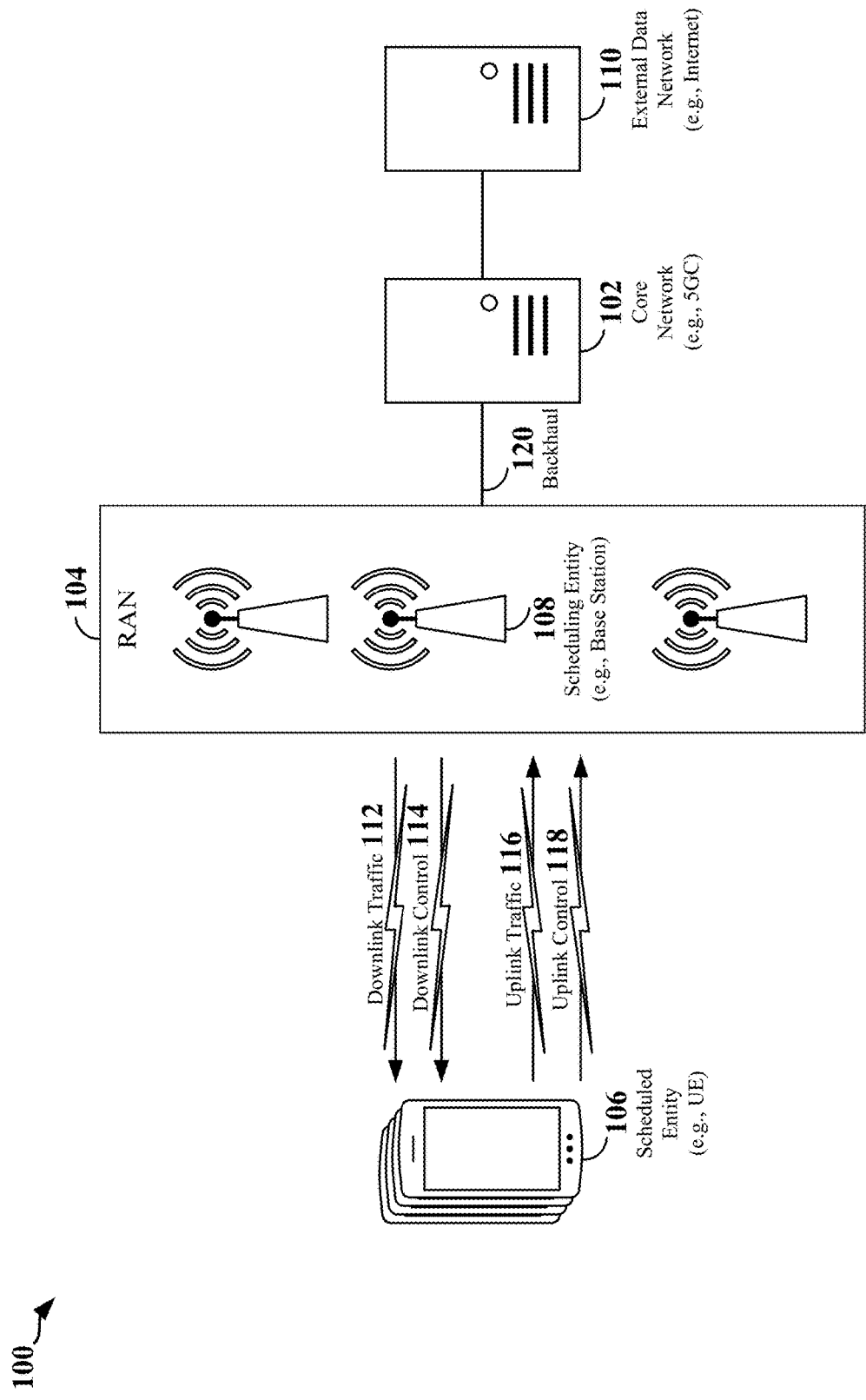
FIG. 1 is a schematic illustration of a wireless communication system according to some aspects.

The various concepts presented throughout this disclosure may be implemented across a broad variety of telecommunication systems, network architectures and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. In OFDM, to maintain orthogonality of the subcarriers or tones, the sub-carrier spacing (SCS) may be equal to the inverse of the symbol period. A numerology of an OFDM waveform refers to its particular subcarrier spacing and cyclic prefix (CP) overhead. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

One or more of the base stations 108 may be configured to define a BWP within an operating bandwidth provided by the wireless communication system, may be further configured to define the structure and quantity of sub-BWPs within the BWP, such that the sub-BWPs can be used for scheduling frequency-hopping transmissions. As one example, a base station 108 may schedule frequency-hopping transmissions using two or more sub-BWPs with an intervening scheduling gap that provides time for a receiver in the UE 106 to retune radio frequency front-end components, such as an antenna, a filter, or an amplifier, which may be a low noise amplifier (LNA).

Figure 2:
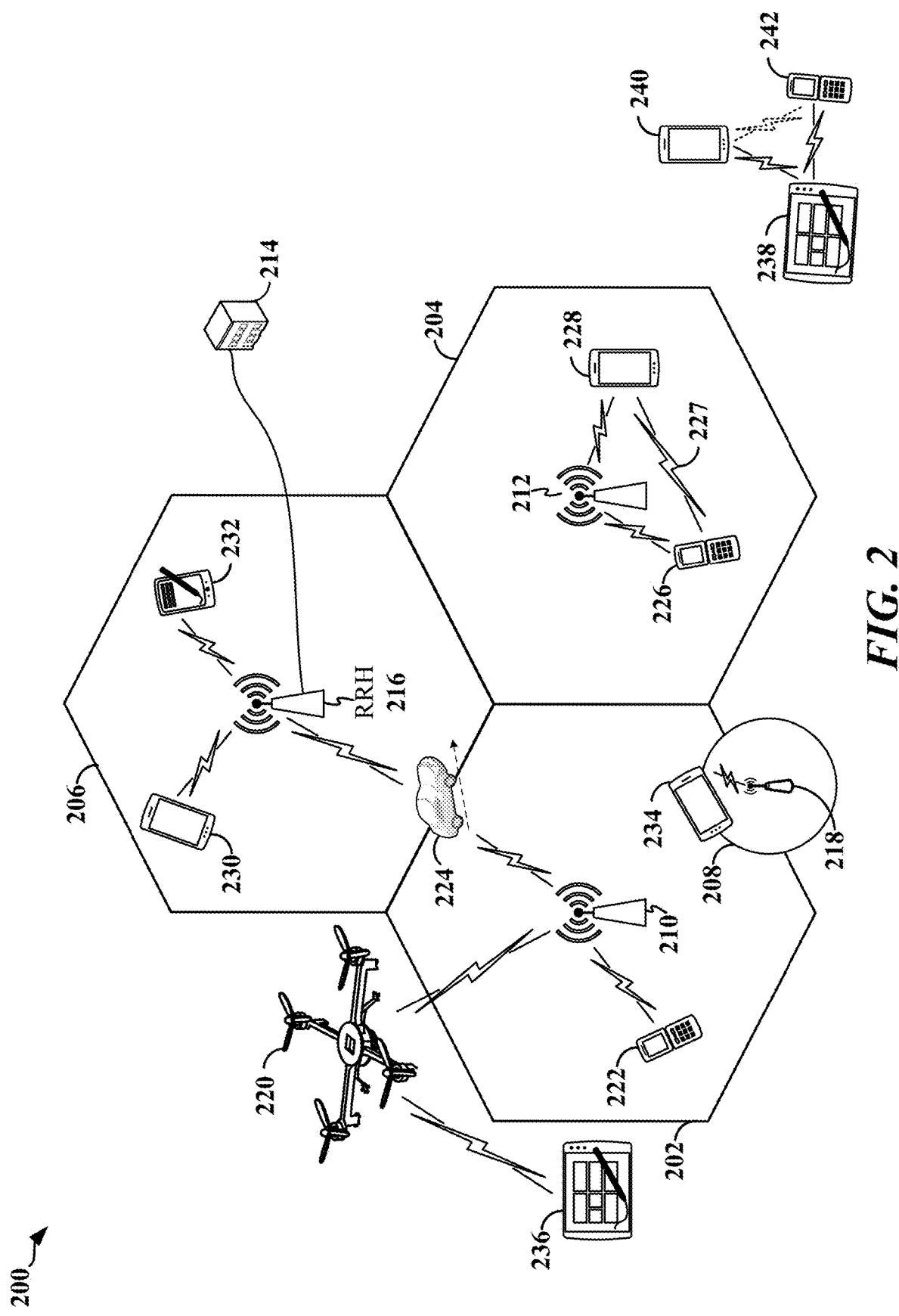
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204 and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204 and 126 may be referred to as macrocells, as the base stations 210, 212 and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214 and/or 218 may be the same as the base station/scheduling entity 108 described above and illustrated in FIG. 1.

Within the RAN 200, the cells may include UEs that may be in communication with one or more sectors of each cell. Further, each base station 210, 212, 214 and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240 and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing OFDM with a cyclic prefix. In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
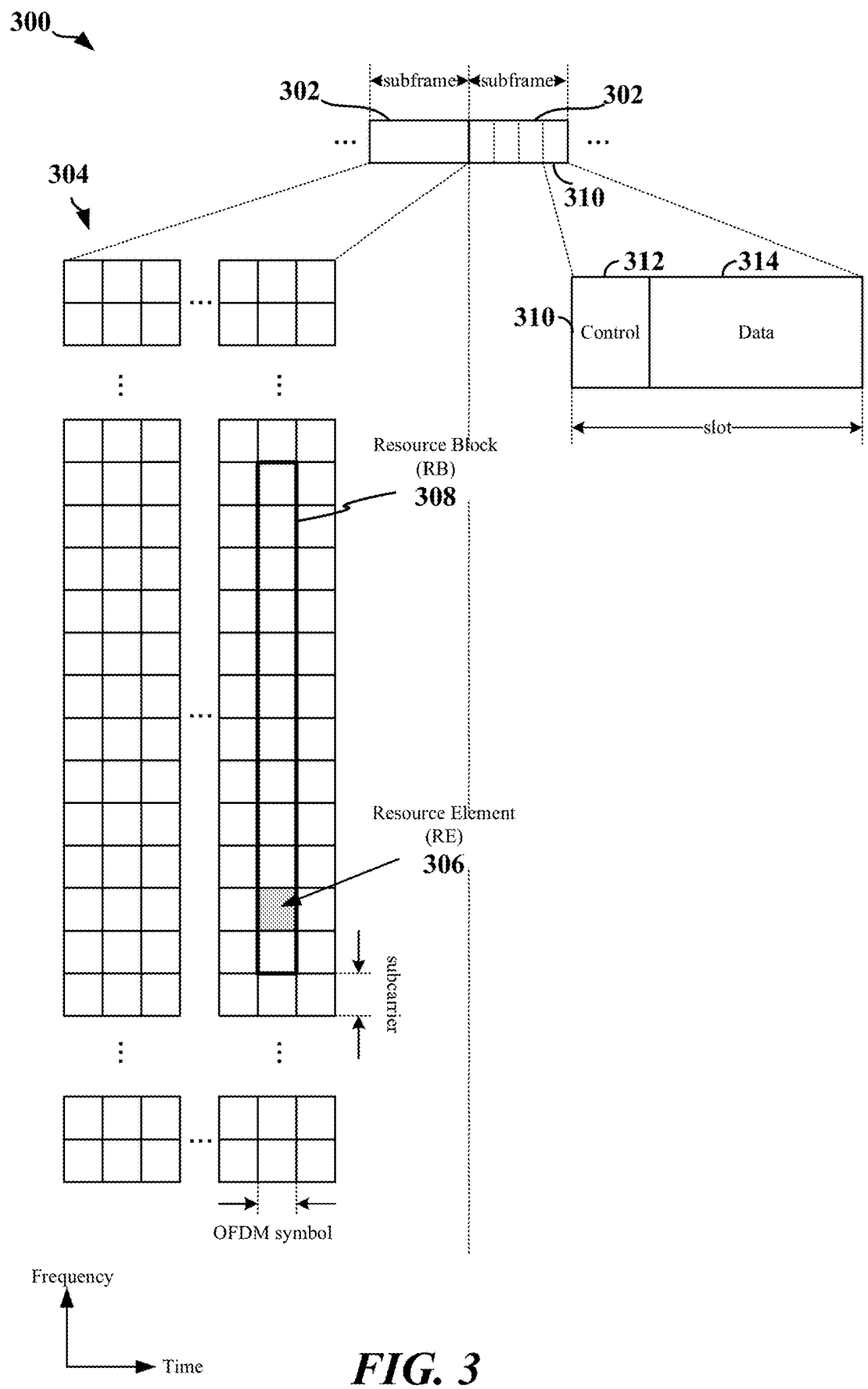
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell. Different types of PDSCH are defined by the 3GPP, where the type may define certain characteristics including location of a DMRS symbol, location of starting symbols for PDSCH, permissible length of PDSCH. For example, PDSCH mapping Type A provides that the DMRS symbol is the third or fourth symbol, whereas DMRS symbol is the first symbol of the PDSCH in PDSCH mapping Type B.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
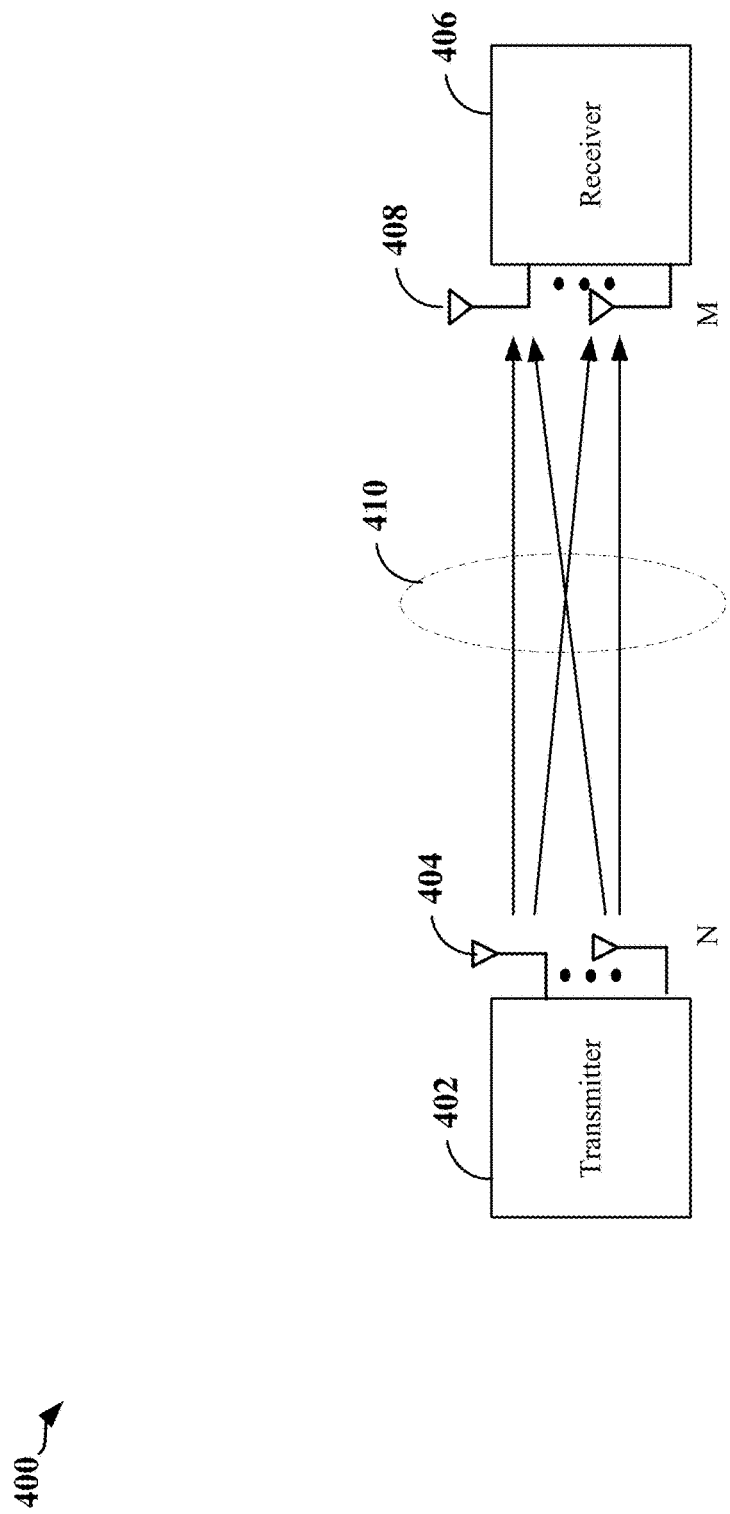
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a synchronization signal block (SSB) or channel state information reference signal (CSI-RS), on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

5G NR networks may provide various services associated with eMBB that can satisfy advanced and diverse system requirements, and that can support communication with premium UEs, including UEs configured for eMBB, URLLC, V2X, etc. In many use cases or applications of 5G NR, peak capabilities are not required and/or UEs need not be as capable as premium UEs. 5G NR can be scaled to enable efficient and cost-effective deployment in applications where peak throughput, latency, reliability, and/or other requirements can be relaxed. In some instances, a scalable 5G NR implementation can optimize cost and efficiency in terms of power consumption and system overhead, for example.

5G NR networks may implement a set of features, which may be referred to as NR-Light, that supports reduced complexity and/or reduced capability UEs. In some examples, reduced complexity UEs may include wearable devices, industrial sensors, video surveillance devices (e.g., stationary cameras), and/or other suitable devices. As compared to standard UEs (e.g., smartphones), reduced complexity UEs may have a lower wireless transmission power, fewer antennas (e.g., antennas for transmitting and/or receiving), a reduced bandwidth for wireless transmission and/or reception, reduced computational complexity/memory, and/or longer battery life.

A reduced complexity and/or reduced capability UE may support a reduced maximum bandwidth (BW). Certain conventional 5G NR protocols or standards may require the UE to support a maximum channel BW defined for the bands in which it operates. In one example the UE may be required to support a 50 MHz for 15 kHz SCS and 100 MHz for 30/60 kHz SCS (for Band n78, which may be 3300 MHz-3800

MHz). A 5G NR-Light UE may support a bandwidth in the range of 5.0 MHz to 20 MHz.

In various implementations, a reduced capability 5G NR-Light UE may be equipped with a single antenna for receiving signals. The limitation to a single receiving antenna reduces diversity in DL signaling. Diversity can improve reliability of the system when, for example, data-encoded signals propagate over multiple paths. DL spatial diversity can be obtained when multiple receive antennas are used to receive DL signals from multiple different propagation paths.

5G NR networks may support very large operating bandwidths relative to previous generations of cellular networks (e.g., LTE). However, requiring a UE to operate across the entire bandwidth of a 5G NR network may introduce unnecessary complexities to the operation of the UE and may significantly increase a UE's power consumption. Therefore, to avoid the need for the operating bandwidth of a UE to match the full bandwidth (also referred to as a carrier bandwidth or a component carrier bandwidth) of a cell in a 5G NR network, 5G NR permits certain UEs to use a bandwidth part (BWP). For example, a BWP (e.g., a configured frequency band) may allow a UE to operate with a narrower bandwidth (e.g., for wireless transmission and/or reception) than the full bandwidth of a cell. In some examples, BWPs may allow UEs with different bandwidth capabilities to operate in a cell with smaller instantaneous bandwidths relative to the full bandwidth configured for the cell. In some examples, a UE may not be required to transmit and or receive outside of the BWP assigned to the UE (also referred to as an active BWP of the UE).

In some examples, for a paired spectrum, a serving cell may configure a maximum of four DL BWPs and four UL BWPs. For an unpaired spectrum, a serving cell may configure a maximum of four DL/UL BWP pairs. For a supplementary uplink (SUL), a serving cell may configure a maximum of 4 UL BWPs.

In some examples, for FDD, a serving cell may support separate sets of BWP configurations for DL and UL per component carrier (CC). DL and UL BWPs may be configured separately and independently for each UE-specific serving cell. The numerology of a DL BWP configuration may apply to PDCCH and PDSCH. The numerology of an UL BWP configuration may apply to PUCCH and PUSCH.

In some examples, for TDD, a serving cell may support a joint set of BWP configurations for DL and UL per CC. DL and UL BWPs may be jointly configured as a pair, with the restriction that the DL/UL BWP pair shares the same center frequency but may be of different bandwidths for each UE-specific serving cell for a UE. The numerology of the DL/UL BWP configuration may apply to PDCCH, PDSCH, PUCCH, and PUSCH. For a UE, if different active DL and UL BWPs are configured, the UE is not expected to retune the center frequency of the channel bandwidth between DL and UL. Supporting the ability to switch a BWP among multiple BWPs is memory consuming, since each BWP requires a whole set of RRC configurations.

When a BWP is allocated to a UE (e.g., an active BWP), the UE tunes its antenna for the BWP and is expected to perform channel state information (CSI) measurements only within its active DL BWP. For example, a UE may be RRC configured with a single active BWP. The UE may not be expected to receive any physical channels or signals (e.g., PDSCH, PDCCH, or a CSI-RS) outside its active BWP. In some configurations, a periodic or semi-persistent CSI report associated with a DL BWP may be scheduled for reporting at a certain time (e.g., during a slot n). In these configurations, a UE may transmit the periodic or semi-persistent CSI report only if the associated DL BWP was the active DL BWP in the time location of the CSI reference resource (e.g., slot $n_{CQI,\ REF}=n-n_{CQI,REF,offset}$) for the periodic or semi-persistent CSI report. In some configurations, for aperiodic CSI report triggering, a single set of CSI triggering states may be RRC configured. The CSI triggering states may be associated with either candidate DL BWP. A UE may not be expected to be triggered with a CSI report for a non-active DL BWP. When a UE performs a measurement or transmits an SRS outside of its active BWP, it is considered a measurement gap. During the measurement gap, the UE is not expected to monitor a control resource set (CORESET).

Figure 5:
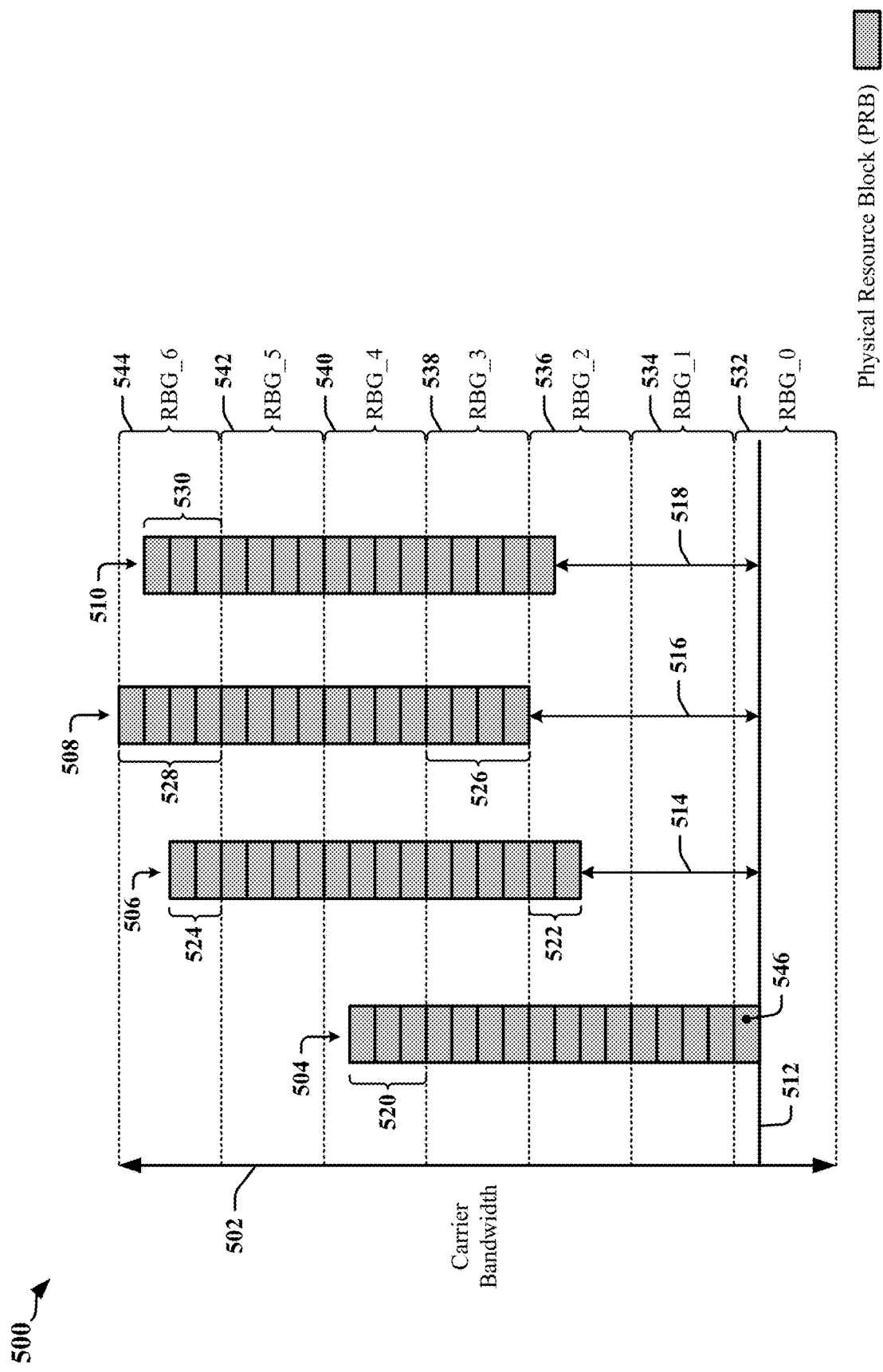
FIG. 5 illustrates an example of a physical resource block grid within a carrier bandwidth of a 5G NR network that may be configured in accordance with various aspects of the disclosure.

FIG. 5 provides an example of a physical resource block (PRB) grid 500 within a carrier bandwidth 502 of a 5G NR network in accordance with various aspects of the disclosure. As shown in FIG. 5, the PRB grid 500 includes seven resource block groups (RBGs), such as RBG_0 532, RBG_1 534, RBG_2 536, RBG_3 538, RBG_4 540, RBG_5 542, RBG_6 544. In the example implementation of FIG. 5, each RBG includes four PRBs (e.g., RBG size=4). As further shown in FIG. 5, the PRB grid 500 includes BWPs 504, 506, 508 and 510. In the example implementation of FIG. 5, each of the BWPs 504, 506, 508 and 510 includes 16 PRBs.

In one example, a UE may be configured with an active BWP 504, and each of the other BWPs 506, 508 and 510 may be configured with a frequency domain (FD) offset 514, 516, 518 relative to the active BWP 504. The FD offsets 514, 516, 518 may be indicated as a number (M) physical resource blocks (PRBs), which may be a positive or negative integer. In the illustrated example, a first FD offset 514 may be 7 PRBs (e.g., M=7) relative to a starting PRB 546 of the active BWP 504 as indicated by line 512, a second FD offset 516 may be 9 PRBs (e.g., M=9) relative to the starting PRB 546 of the active BWP 504, and a third FD offset 518 may be 8 PRBs (e.g., M=8) relative to the starting PRB 546 of the active BWP 504.

In some aspects of the disclosure, the FD offset relative to the single active BWP may be indicated as N resource block groups (RBGs 532, 534, 536, 538, 540, 542, 544), where N may be a positive or negative integer. In some aspects of the disclosure, each of the RBGs 532, 534, 536, 538, 540, 542, 544 may have the same RBG size as the active BWP. For example, if each of the RBGs 532, 534, 536, 538 in the active BWP 504 has an RBG size of 4, the UE may determine that each of the N RBGs in the third FD offset 516 also has an RBG size of 4.

Cross-BWP Frequency Hopping

Certain versions of 5G NR specifications, including releases 15 and 16 of the specifications, prohibit a UE from transmitting PUSCH or PUCCH outside of an active UL BWP. These specifications may also prohibit the UE from receiving PDSCH outside of an active DL BWP. Furthermore, these specifications may provide that PUSCH and PUCCH frequency hopping remain within the boundaries of the active BWP. PDSCH frequency hopping is not supported in these specifications.

Certain benefits may be accrued by a 5G NR-light UE from cross-BWP frequency hopping for PUSCH, PUCCH, and/or PDSCH. Cross-BWP frequency hopping can provide increased diversity when the UE is configured for a reduced maximum BW limit diversity gain and is limited to intra-BWP frequency hopping on the UL. Frequency hopping in a reduced-capability UE can also offset loss of DL diversity when the reduced capability UE is equipped with single receiving antenna.

Figure 6:
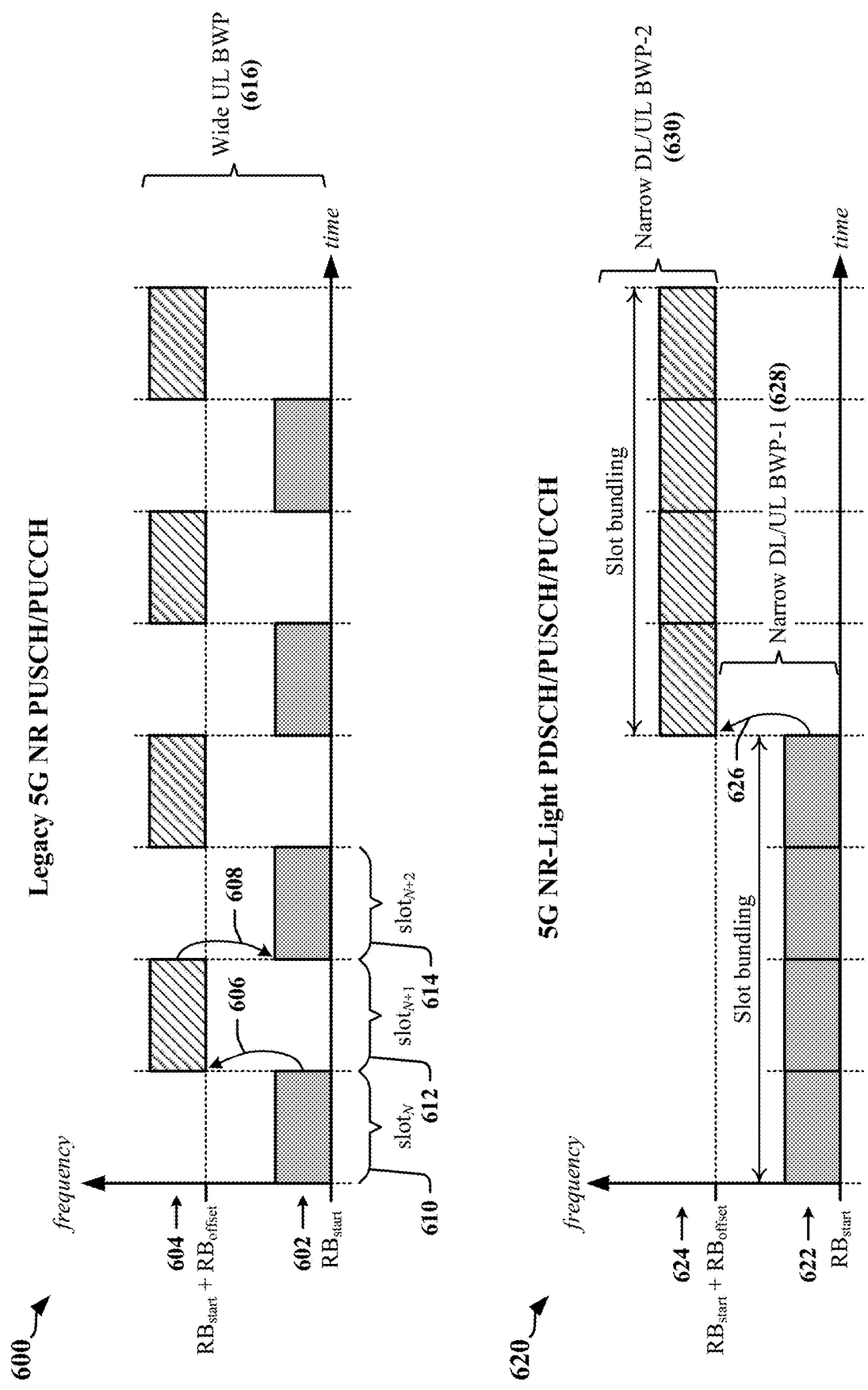
FIG. 6 illustrates a resource block grid for conventional intra-BWP frequency hopping PDSCH, PUSCH and/or PUCCH.

FIG. 6 illustrates a first resource block grid 600 for conventional intra-BWP frequency hopping PUSCH and/or PUCCH. A wide UL PWP 616 includes a first set of RBs 602 that is offset in frequency from a second set of RBs 602, and where hops 606, 608 occur between RBs of successive slots 610, 612, 614. Each hop 606, 608 is associated with RF retuning in which, for example, the UE tunes its antenna to the center frequency used by the current set of RBs 602, 604. FIG. 6 illustrates a second resource block grid 620 in which RF retuning can be reduced through the use of slot bundling. Slot bundling involves grouping the RBs in each set of RBs 622, 624 into successive slots, forming narrow BWPs 628, 630, such that PUSCH and/or PUCCH can be scheduled to use the same resources for multiple successive slots. In the illustrated example, the single hop 626 between the narrow BWPs 628, 630 can result in a significant reduction in RF retuning performed by the UE. Slot bundling can also improve channel estimation and/or phase tracking.

Certain aspects of this disclosure relate to cross-BWP frequency hopping. In one example, cross-BWP frequency hopping is provided between two or more companion BWPs. The BWPs in a pair of companion BWPs are defined at two different frequency locations with the same bandwidth and numerology (SCS and CP length). Each hop between companion BWPs involves changing the active BWP to a companion BWP, which involves a switching delay. 5G NR specifications define a BWP switch delay with a duration sufficient to accommodate RF retuning when switching the active BWP, and to guarantee that PDSCH is reliably received.

Figure 7:
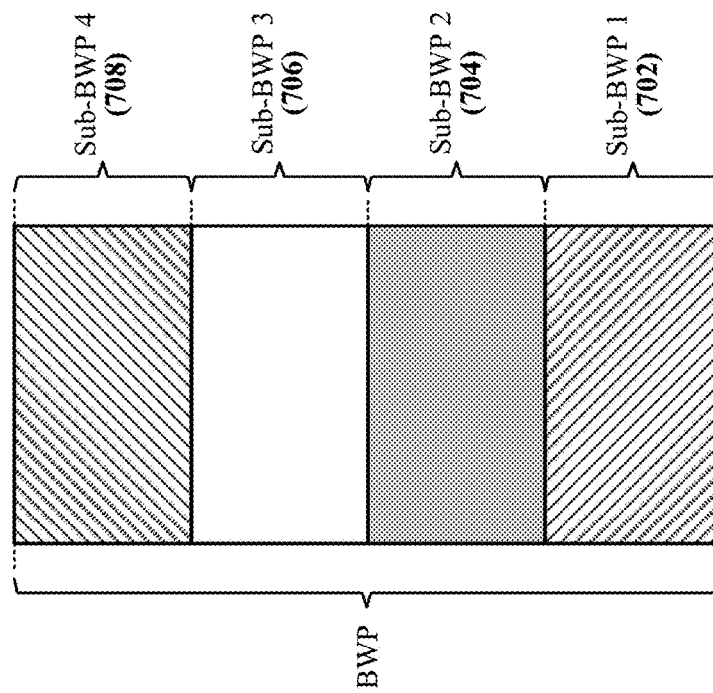
FIG. 7 illustrates a BWP that may be configured with multiple sub-BWPs in accordance with various aspects of the disclosure.

In another example, cross-BWP frequency hopping can be provided between sub-BWPs configured within an active BWP. A sub-BWP may also be referred to herein as a subband or a narrowband (NB). FIG. 7 illustrates a BWP 700 that is configured with multiple sub-BWPs 702, 704, 706, 708. The sub-BWPs 702, 704, 706, 708 may be defined at different frequency locations within the BWP 700. The sub-BWPs 702, 704, 706, 708 may be configured with the same bandwidth. Each sub-BWP 702, 704, 706, 708 retains the numerology (SCS and CP length) of the BWP 700, such that the sub-BWPs 702, 704, 706, 708 have a common numerology. Certain aspects of this disclosure are directed to the frequency-hopping between sub-BWPs.

Figure 8:
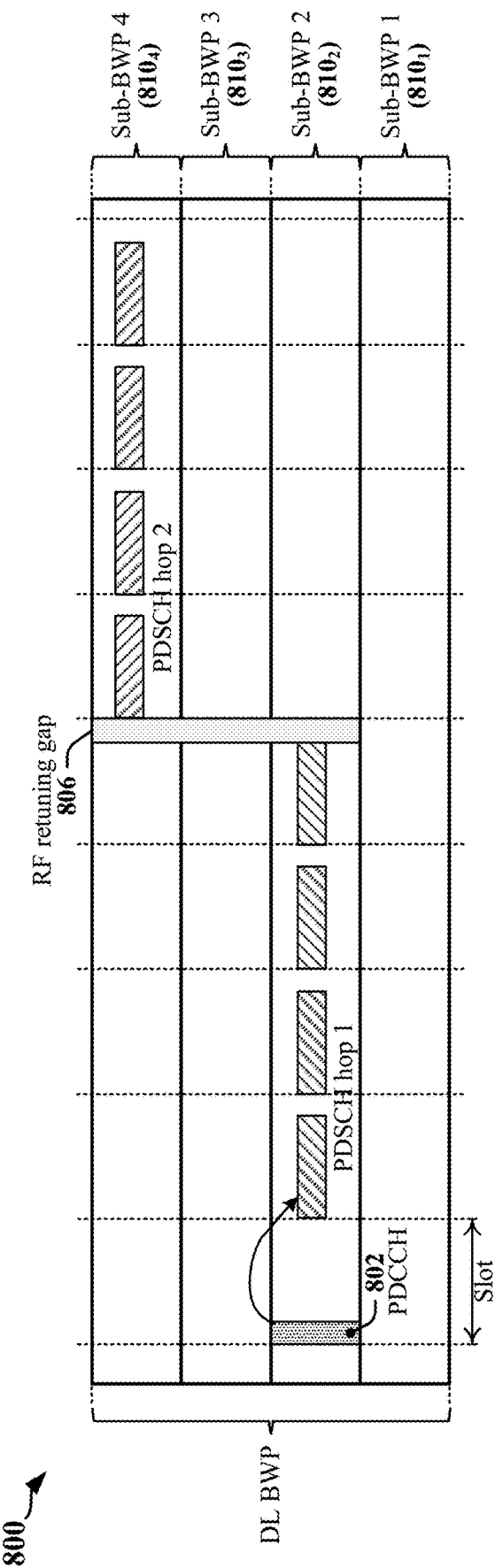
FIG. 8 illustrates certain aspects of downlink BWPs provided within a carrier bandwidth of a 5G NR network in accordance with various aspects of this disclosure.
Figure 8:
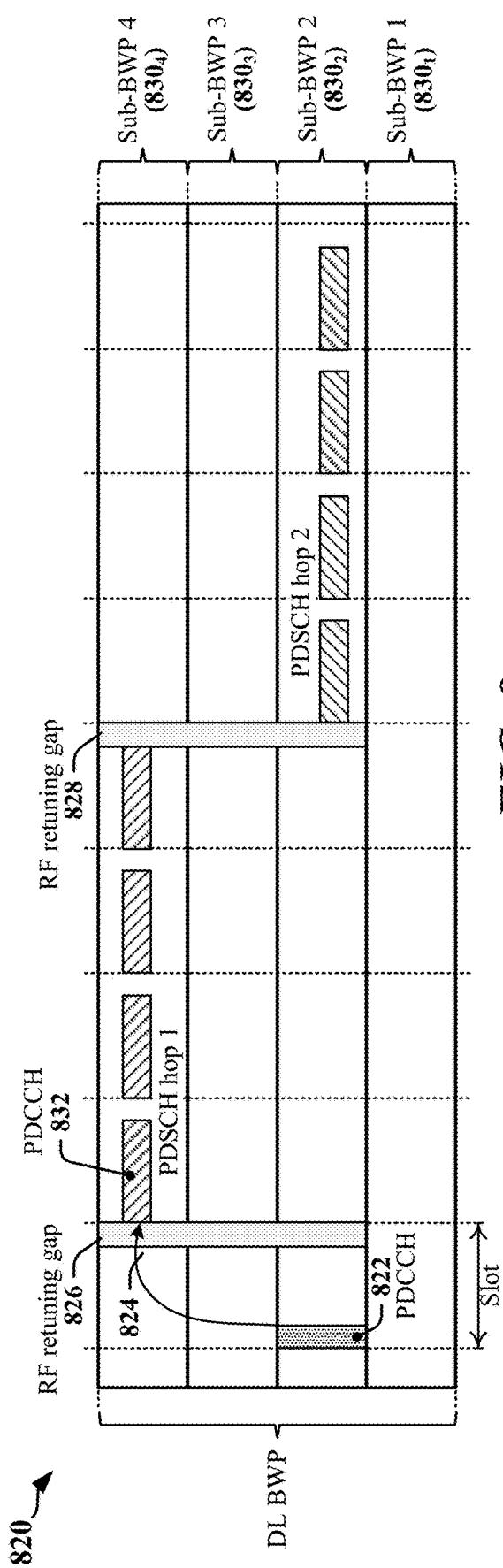

FIG. 8 illustrates certain aspects of DL BWPs 800, 820 that may be provided within a carrier bandwidth of a 5G NR network in accordance with various aspects of this disclosure. Four sub-BWPs $810_{1-4}$, $830_{1-4}$ are defined in each DL BWP 800, 820. The sub-BWPs $810_{1-4}$, $830_{1-4}$ have the same bandwidth and numerology.

In the illustrated partitioned DL BWPs 800, 820, PDSCH may be scheduled in the same or different sub-BWP $810_2$, $830_2$ in which PDCCH 802, 822 is monitored and received. PDSCH may alternatively or additionally be scheduled in sub-BWPs $810_1$, $810_3$, $810_4$, $830_1$, $830_3$, $830_4$ in which PDCCH is not monitored or received. In one example, PDCCH 802 and PDSCH are scheduled in successive slots in the same sub-BWP $810_2$ of the first DL BWP 800. In another example, PDCCH 822 is monitored and received in one sub-BWP $830_2$ of the second DL BWP 820 and PDSCH is scheduled in a different sub-BWP $830_4$ in the next slot of the second DL BWP 820. A hop 824 occurs after the slot in which PDCCH 822 is scheduled, causing a gap 826 in which RF retuning may be performed. Gaps 806 and 828 may be scheduled or configured by a base station for hops between consecutive slots in which PDSCH is scheduled. In other examples, a hop may occur at the commencement of the slot in which PDCCH is scheduled when PDSCH was scheduled in a different sub-BWP in the previous slot.

A gap provided for RF retuning between PDCCH and PDSCH can cause the UE to miss the PDSCH, for example. DL buffering is not available before RF retuning has been completed, and it is possible for the UE to miss DL buffering for PDSCH scheduled to be received in a different sub-BWP before RF retuning has been completed. The BWP switch delay defined by 5G NR specifications does not apply to hops between sub-BWPs that occur within the active BWP.

Various aspects of this disclosure enable PDSCH to be reliably received when sub-BWP hopping is implemented. Other aspects of this disclosure provide sub-BWP partitioning schemes that can support sub-BWP hopping.

An RF retuning gap for DL BWPs can be provided in accordance with certain aspects of this disclosure by scheduling transmissions that satisfy a threshold minimum time between PDCCH and PDSCH. In one example, multi-slot PDSCH may be scheduled in multiple sub-BWPs $830_2$, $830_4$, and PDCCH may be monitored and received in one of the sub-BWPs $830_2$. The PDSCH 832 scheduled to follow the PDCCH 822 commences in a different sub-BWP $830_4$ and frequency hopping occurs from the sub-BWPs $830_2$ carrying the PDCCH 822. In this example, a scheduling gap provided between the PDCCH 822 and the PDSCH 832 may be configured to satisfy a minimum or threshold period that enables RF tuning to be completed before PDSCH 832 is received. In various implementations, the scheduling gap and/or threshold can be expressed as a number of symbols or as a number of slots.

In certain implementations, the scheduling gap may be defined as a number of symbols between the end of the PDCCH 822 and the commencement of the PDSCH 832. The scheduling gap may be defined to be no smaller than a threshold number of symbols ($N_{th}$) associated with the RF retuning time ($N_{retuning}$). In one example, $$N_{th}=N+N_{retuning}$$

where N is PDCCH decoding time, and $N_{th}$ and/or $N_{retuning}$ are based on reported UE capability and SCS.

In certain implementations, the scheduling gap may be defined as a slot level scheduling delay. A slot offset between PDCCH 822 and PDSCH 832 (K0) may be defined to be no smaller than a threshold number of slots ($K_{th}$) associated with the RF retuning time. In one example, a first PDSCH mapping (PDSCH mapping type A) prohibits same-slot scheduling (K0=0), and $$K_{th,A}=K_{th,B}+1$$

where $K_{th,A}$ is the threshold number of slots for PDSCH mapping type A, and $K_{th,B}$ is the threshold number of slots for PDSCH mapping type B. PDSCH mapping type A is permitted by Specifications to commence at one of the first 4 symbols (symbol 0, 1, 2, or 3) of a slot, where the first DMRS symbol is provided as symbol 2 or symbol 3. PDSCH mapping type B can start at any symbol of a slot with a front loaded DMRS. In some instances, the threshold number of slots for PDSCH mapping type A is the same as the threshold number of slots for PDSCH mapping type B ($K_{th,A}=K_{th,B}=K_{th}$). If K0=$K_{th}$, then one or more of the symbols before the first DMRS symbol may be punctured.

Figure 9:
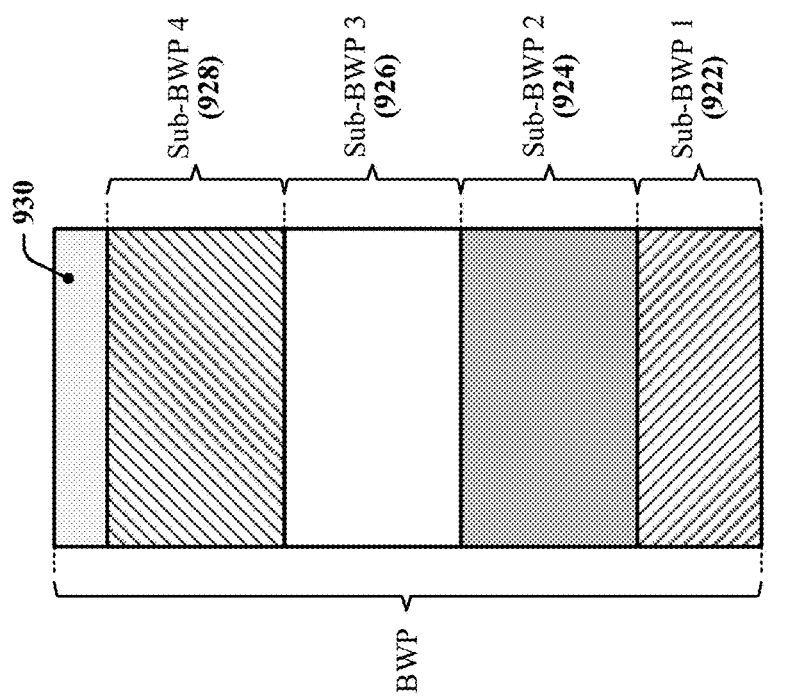
FIG. 9 illustrates examples of aligned BWPs that are partitioned for use in uplink and downlink transmissions in accordance with various aspects of this disclosure.
Figure 9:
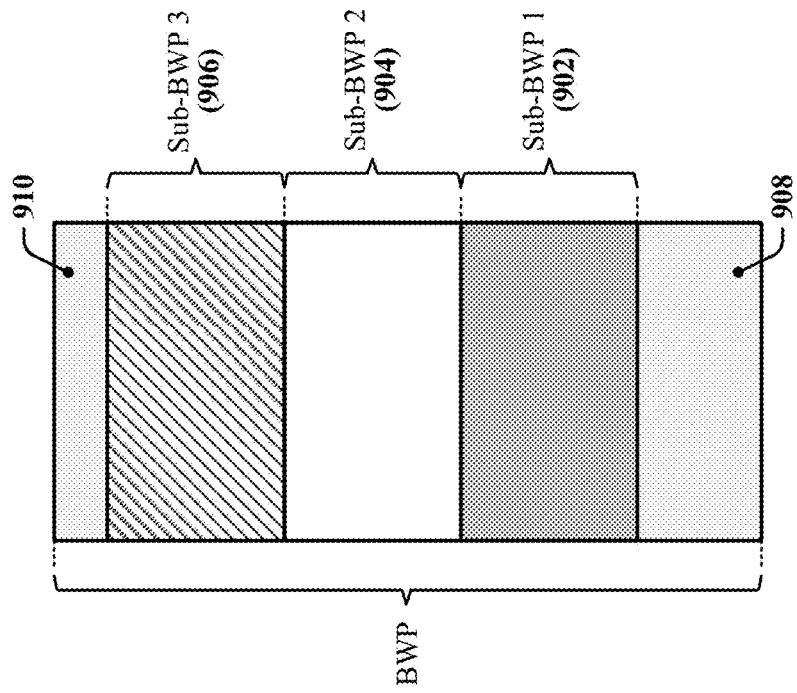

A BWP may be partitioned to support sub-BWP hopping in accordance with certain aspects of the disclosure. FIG. 9 illustrates examples of BWPs 900, 920 that are aligned with RBGs and partitioned for use in UL and DL transmissions. A first BWP 900 includes sub-BWPs 904, 906, 908 that are aligned with RBGs. The size of the sub-BWPs 904, 906, 908 is defined as a number of RBGs. In some implementations, a set of edge RBs 902 or 910 that has an aggregate size that is less than the size of the sub-BWPs 904, 906, 908 may be unused. In some implementations, a set of edge RBs 902 or 910 may be unused if the aggregate size of the set of edge RBs 902 or 910 is less than a configured threshold size. A second BWP 920 includes sub-BWPs 922, 924, 926, 928 where one sub-BWP 922 has fewer RBs than the other sub-BWPs 924, 926, 928. In this example, the smaller sub-BWP 922 is configured when the number of RBs at one edge equals or exceeds a threshold minimum number of RBs. In this example, the number of the RBs 930 at the other edge is less than the threshold minimum number of RBs and are unused.

Figure 10:
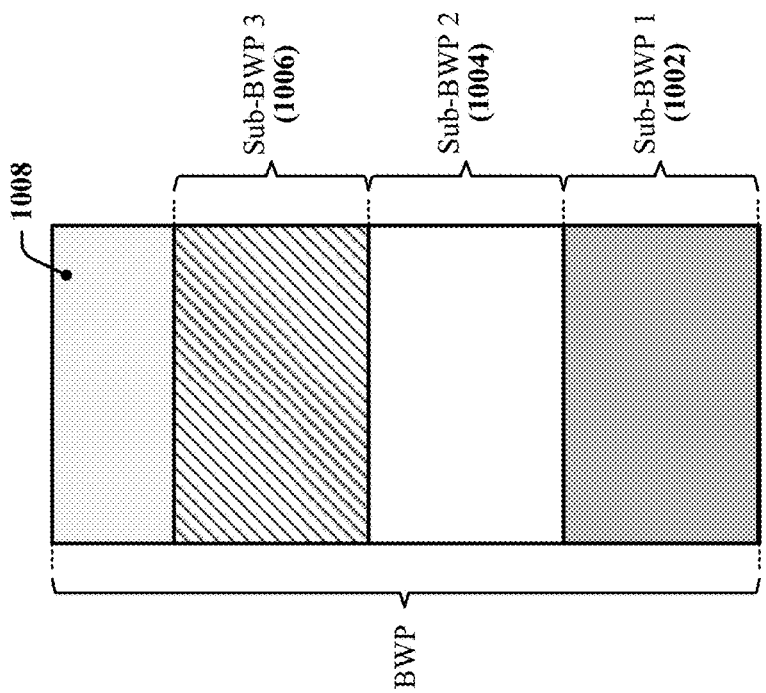
FIG. 10 illustrates an example of an unaligned BWP that is partitioned for use in uplink and downlink transmissions in accordance with various aspects of this disclosure.

FIG. 10 illustrates an additional example of a BWP 1000 that may be partitioned for use in UL and DL transmissions into sub-BWPs 1002, 1004, 1006 that need not be aligned with RBGs. In the illustrated example, a remainder 1008 of unused RBs remain at one or more edge after the sub-BWPs 1002, 1004, 1006 have been defined. The remainder may be expressed as a quantity (M), where:

$$M = N_{RB}^{BWP} \mod N_{RB}^{sub},$$

and where: $N_{RB}^{BWP}$ is the BWP size expressed as a number of RBs, and $N_{RB}^{sub}$ is the sub-BWP size expressed as a number of RBs.

In some implementations, the remainder M is compared with one or more thresholds to determine sub-BWP partitioning. In one example, a single threshold $M_{th}$ is defined. If $M \geq M_{th}$, then the M RBs at the BWP edge can be used as one smaller sub-BWP or narrowband that includes fewer RBs than the other sub-BWPs 1002, 1004, 1006. If $M < M_{th}$, then the remaining M RBs in the remainder 1008 at the BWP edge is not scheduled and/or used.

In one example, two thresholds $M_{th1}$ and $M_{th2}$ are defined, where $M_{th2} < M_{th1}$. If $M \geq M_{th}$, then M RBs at the BWP edge are used as one sub-BWP that includes fewer RBs than the defined sub-BWPs 1002, 1004, 1006. If $M < M_{th2}$, then M RBs at the BWP edge are not used. If $M_{th2} \leq M < M_{th1}$), and $N_{RG}^{sub}$ is the size of a sub-BWP, then two sub-BWPs may be defined by partitioning ($M + N_{RB}^{sub}$) RBs, where each of the two sub-BWPs has a size:

$$\frac{M + N_{RB}^{sub}}{2},$$

or the two sub-BWPs have size $$\left\lfloor \frac{M + N_{RB}^{sub}}{2} \right\rfloor \text{ and } \left\lceil \frac{M + N_{RB}^{sub}}{2} \right\rceil$$

respectively, where $\lfloor \ \rfloor$ represents round down for an integer, and $\lceil \ \rceil$ represents round up for an integer.

The partitioned sub-BWPs may be located at the two edges of the BWP 920. In some implementations:

$$M_{th1} = \frac{N_{RB}^{sub} + M_{th2}}{2}.$$

In one example, $N_{RB}^{NB} = 24$, $M_{th1} = 16$, $M_{th2} = 8$.

Figure 11:
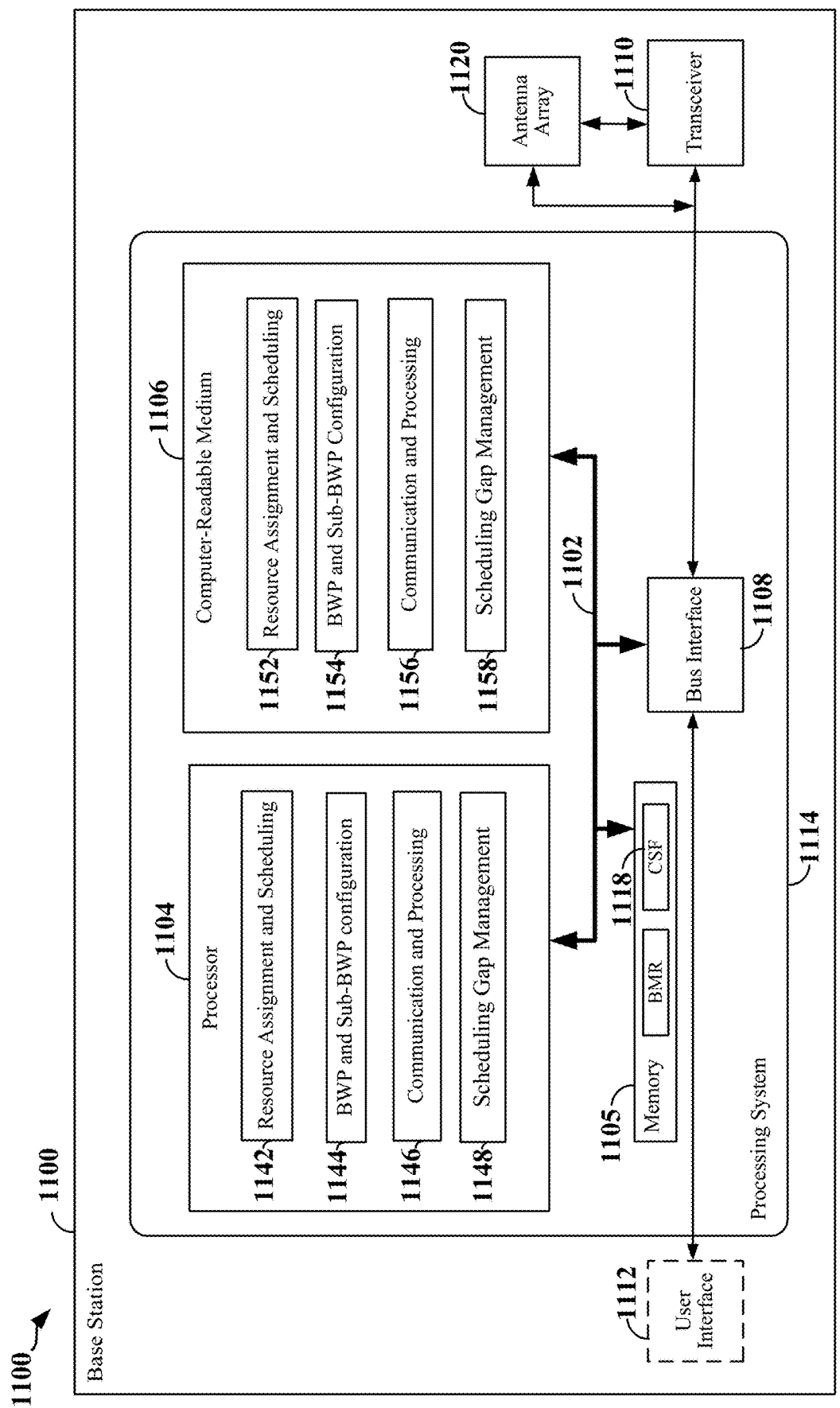
FIG. 11 is a block diagram illustrating an example of a hardware implementation for a base station employing a processing system according to some aspects.

FIG. 11 is a conceptual diagram illustrating an example of a hardware implementation for an exemplary base station 1100 employing a processing system 1114. For example, the base station 1100 may be a base station as illustrated in any one or more of FIG. 1 or 2. The processing system 1114 may include a bus interface 1108, a bus 1102, memory 1105, a processor 1104, and a computer-readable medium 1106. The computer-readable medium 1106 may store or maintain computer-executable code, instructions and/or software. Furthermore, the base station 1100 may include an optional user interface 1112 and a transceiver 1110 that can provide a means for communicating with various other apparatus over a transmission medium (e.g., air interface). In addition, the base station 1100 may further include one or more antenna array modules 1120. In accordance with various aspects of the disclosure, an element, or any portion of an element, or any combination of elements may be implemented with the processing system 1114 that includes one or more processors 1104. That is, the processor 1104, as utilized in a base station 1100, may be used to implement any one or more of the processes described below.

In some aspects of the disclosure, the processor 1104 may include circuitry configured for various functions. For example, the processor 1104 may include resource assignment and scheduling circuitry 1142, configured to generate, schedule, and modify a resource assignment or grant of time-frequency resources (e.g., a set of one or more resource elements). For example, the resource assignment and scheduling circuitry 1142 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1142 may cooperate with BWP and sub-BWP configuration circuitry 1144. The BWP and sub-BWP configuration circuitry 1144 may be configured to define BWPs and/or sub-BWPs, and may allocate resource blocks in a BWP to sub-BWPs. The resource assignment and scheduling circuitry 1142 may be further configured to allocate/schedule uplink and/or downlink resources, including resources allocated or scheduled for BWPs and/or sub-BWPs. The uplink and downlink resources may be used for the transmission of PUSCH, PUCCH, PDSCH, etc., between the UE and the base station 1100. The resource assignment and scheduling circuitry 1142 may further be configured to execute resource assignment and scheduling software 1152 stored in the computer-readable medium 1106 to implement one or more of the functions described herein. The BWP and sub-BWP configuration circuitry 1144 may further be configured to execute BWP and sub-BWP configuration software 1154 stored in the computer-readable medium 1106 to implement one or more of the functions described herein.

The processor 1104 may further include communication and processing circuitry 1146 configured to communicate with a UE. In some examples, the communication and processing circuitry 1146 may include one or more hardware components that provide the physical structure that performs processes related to wireless communication (e.g., signal reception and/or signal transmission) and signal processing (e.g., processing a received signal and/or processing a signal for transmission). The communication and processing circuitry 1146 may be configured to transmit a CSI-RS to the UE and receive channel state feedback (CSF) 1118 from the UE in response to the CSI-RS. The CSF may include, for example, a channel quality indicator (CQI), precoding matrix indicator (PMI) and rank indicator (RI). In some examples, the communication and processing circuitry 1146 may store the CSF 1118 in memory 1105 for further processing. In addition, the communication and processing circuitry 1146 may be configured to implement a HARQ feedback mechanism to receive ACK/NACK from the UE. The communication and processing circuitry 1146 may further be configured to execute communication and processing software 1156 stored on the computer-readable medium 1106 to implement one or more functions described herein.

The processor 1104 may further include scheduling gap management circuitry 1148 configured to provide a scheduling gap between two frequency hopping channels scheduled for transmission in the two or more sub-BWPs. The scheduling gap management circuitry 1148 may further be configured to provide the scheduling gap that accommodates radio frequency retuning at the UE. In one example, the scheduling gap management circuitry 1148 may provide the scheduling gap after PDCCH scheduled in a first sub-BWP and before PUSCH that is scheduled in a second sub-BWP. The scheduling gap management circuitry 1148 may further be configured to execute scheduling gap management circuitry 1158 stored on the computer-readable medium 1106 to implement one or more functions described herein.

In certain examples, the processing system 1114 of the base station 1100 configures a portion of an operating bandwidth to serve as a BWP used for communicating with a UE over the wireless communication network, defines two or more sub-BWPs at different frequency locations within the BWP, each sub-BWP including resource blocks provided in the BWP, and provides a scheduling gap when a frequency hop is scheduled between two or more sub-BWPs at the UE. The scheduling gap may accommodate radio frequency retuning at the UE.

In certain examples, the processing system 1114 is further configured to transmit a PDCCH in a first sub-BWP, and transmit a PDSCH scheduled by the PDCCH with a preceding hop in a second sub-BWP the PDSCH commencing after the scheduling gap. The scheduling gap may be provided after the PDCCH. The scheduling gap may include an integer number of symbols. The processing system 1114 may be configured to determine a first number of symbols (N) associated with a processing time for the PDCCH, and determine a second number of symbols ($N_{retuning}$) associated with a time for the radio frequency retuning at the UE, wherein the scheduling gap covers at least N+$N_{retuning}$ symbols.

In some examples, the scheduling gap includes a slot offset that includes an integer number of slots. The integer number of slots ($K_{th,A}$) for PDSCH that complies with PDSCH mapping type A defined by the 3GPP is different than the integer number of slots ($K_{th,B}$) for PDSCH that complies with physical downlink shared channel mapping type B defined by the 3GPP. For example, $K_{th,A}=K_{th,B}+1$.

In some examples, the PDSCH conforms to PDSCH mapping type A defined by the 3GPP, and the PDCCH and PDSCH are prohibited from being transmitted in a same slot. One or more symbols preceding a symbol that carries a DMRS are punctured when PDSCH that complies with PDSCH mapping type A.

In certain examples, the processing system 1114 is further configured to determine a first number ($N_{RB}^{BWP}$) quantifying resource blocks in the BWP, determine a second number ($N_{RB}^{sub}$) quantifying resource blocks in each sub-BWP, determine a third number (M) quantifying remaining resource blocks, where M=$N_{RB}^{BWP}$ mod $N_{RB}^{sub}$, where M resource blocks located at one or both edges of the BWP are unused.

In certain examples, the processing system 1114 is further configured to determine a first number ($N_{RB}^{BWP}$) quantifying resource blocks in the BWP, determine a second number ($N_{RB}^{sub}$) quantifying resource blocks in each sub-BWP, determine a third number (M) quantifying remaining resource blocks, where M=$N_{RB}^{BWP}$ mod $N_{RB}^{sub}$, and determine a size of at least one sub-BWP located at an edge of the BWP that includes fewer than $N_{RB}^{sub}$ resource blocks when the number of remaining resource blocks equals or exceeds a first threshold number. M resource blocks located at one or both edges of the BWP are unused when M is less than the first threshold number. In some instances, the processing system 1114 may be further configured to define two equally-sized edge sub-BWPs, each edge sub-BWP including (M+$N_{RB}^{sub}$)/2 resource blocks when the number of remaining resource blocks is less than the first threshold number.

Figure 12:
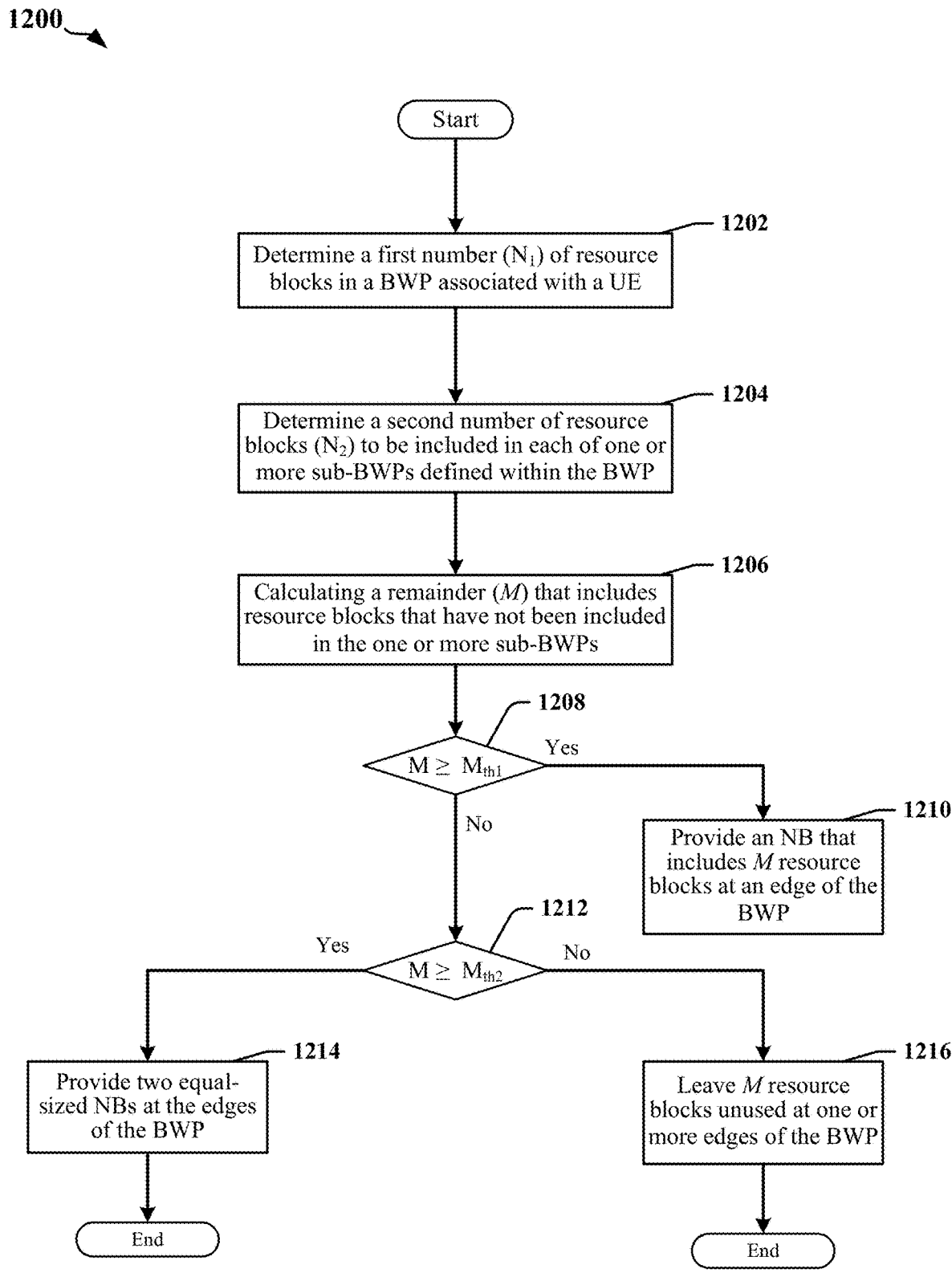
FIG. 12 is a flow chart of a method for a base station to partition a BWP in accordance with certain aspects disclosed herein.

FIG. 12 is a flow chart 1200 of a method for a base station to partition a BWP in accordance with certain aspects disclosed herein. The method employs two thresholds. At block 1202, the base station may determine a first number of RBs in a BWP associated with a UE. The UE may be a reduced capability 5G NR-Light UE. The first number of RBs may be denoted as $N_{RB}^{BWP}$. At block 1204, the base station may determine a second number of RBs to be provided in a sub-BWP within the BWP. The second number of RBs may be denoted as $N_{RB}^{sub}$. The sub-BWP may be one of multiple sub-BWPs that are used to schedule frequency hopping PUSCH, PUCCH, and/or PDSCH. At block 1206, the base station may calculate a remainder (M) that includes resource blocks that have not been included or that will not be included in the one or more sub-BWPs. The remainder may be calculated as M=$N_{RB}^{BWP}$ mod $N_{RB}^{sub}$.

If at block 1208, the base station determines that the remainder is at least as great as a first threshold ($M_{th1}$), then at block 1210 the base station may provide a sub-BWP that includes M resource blocks at an edge of the BWP. If at block 1208, the base station determines that the remainder is less than the first threshold, then the base station may compare the remainder to a second threshold ($M_{th2}$) at block 1212. If at block 1212, the base station determines that the remainder is at least as great as the second threshold ($M_{th1}$), then at block 1214 the base station may provide two equal-sized sub-BWPs at the edges of the BWP by partitioning. In one example, each sub-BWP includes (M+$N_{RB}^{sub}$)/2 RBs. If at block 1212, the base station determines that the remainder is less than the second threshold, then M resource blocks may be unused and located at one or more edges of the BWP.

Figure 13:
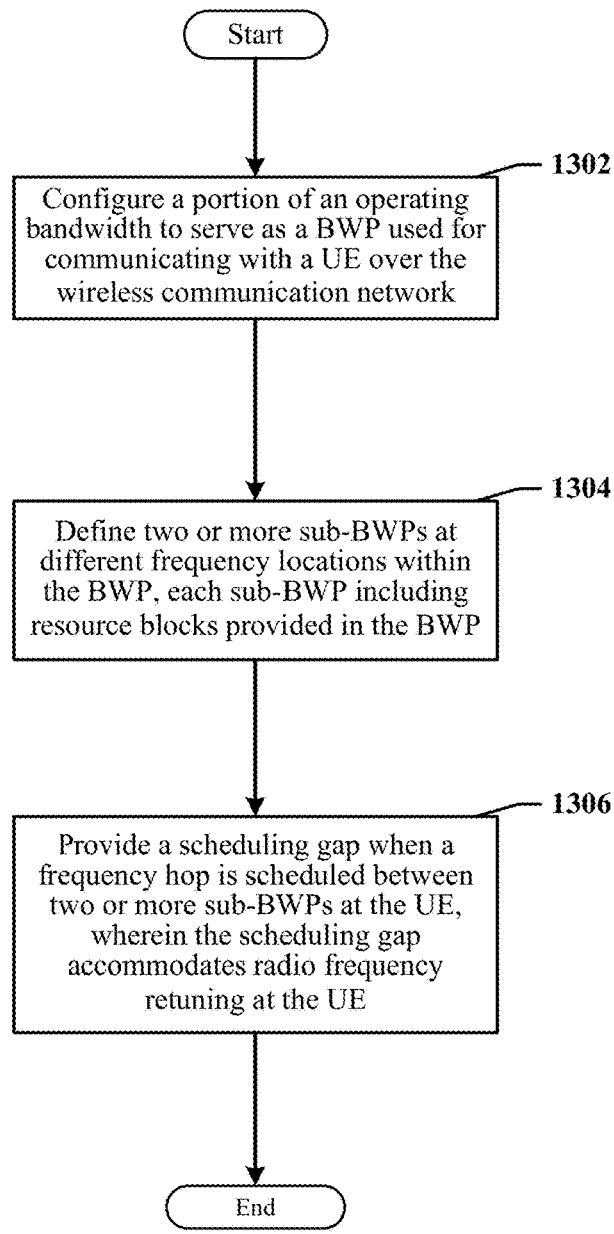
FIG. 13 is a flow chart of a method for wireless communication at a base station in a wireless communication network.

FIG. 13 is a flow chart 1300 of a method for wireless communication at a base station in a wireless communication network. The base station may configure sub-BWPs in accordance with certain aspects disclosed herein. At block 1302, the base station may a portion of an operating bandwidth to serve as a BWP used for communicating with a UE over the wireless communication network. In one example, the UE is a reduced capability or reduced complexity UE. The UE may have a single receive antenna. At block 1304, the base station may define two or more sub-BWPs at different frequency locations within the BWP. Each sub-BWP may include resource blocks provided in the BWP. In one example, each sub-BWP has a size that is defined or expressed as a number of RBGs. In another example, the sub-BWPs are not necessarily aligned RBGs. At block 1306, the base station may provide a scheduling gap when a frequency hop is scheduled between two or more sub-BWPs at the UE. The scheduling gap accommodates radio frequency retuning at the UE. The duration of the scheduling gap may be calculated based on the time required for the UE to perform RF retuning when a hop is made between two of the sub-BWPs. RF retuning may include retuning a power antenna, an LNA, or another component in the RF front end of the UE.

In certain examples, the base station may transmit a PDCCH in a first sub-BWP, and transmit PDSCH scheduled by the PDCCH with a preceding hop in a second sub-BWP the PDSCH commencing after the scheduling gap. The scheduling gap is provided after the PDCCH. The scheduling gap may include an integer number of symbols. The base station may determine a first number of symbols (N) associated with a processing time for the PDCCH, and determine a second number of symbols ($N_{retuning}$) associated with a time for the radio frequency retuning at the UE. The scheduling gap may cover at least $N+N_{retuning}$ symbols. The scheduling gap may include a slot offset that includes an integer number of slots. The integer number of slots ($K_{th,A}$) for PDSCH that complies with physical downlink shared channel mapping type A defined by the Third Generation Partnership Project (3GPP) is different than the integer number of slots ($K_{th,B}$) for PDSCH that complies with physical downlink shared channel mapping type B defined by the 3GPP. For example, $K_{th,A}=K_{th,B}+1$. The PDSCH may conform to PDSCH mapping type A defined by the 3GPP, and the PDCCH and PDSCH are prohibited from being transmitted in a same slot. One or more symbols preceding a symbol that carries a DMRS are punctured when the PDSCH conforms to PDSCH mapping type A.

In certain examples, defining the two or more sub-BWPs includes determining a first number ($N_{RB}^{BWP}$) quantifying resource blocks in the BWP, determining a second number ($N_{RB}^{sub}$) quantifying resource blocks in each sub-BWP, determining a third number (M) quantifying remaining resource blocks, where $M=N_{RB}^{BWP} \mod N_{RB}^{sub}$. In one example, M resource blocks located at one or both edges of the BWP are unused. In another example, the base station may determine a size of at least one sub-BWP located at an edge of the BWP that includes fewer than $N_{RB}^{sub}$ resource blocks when the number of remaining resource blocks equals or exceeds a first threshold number, where M resource blocks located at one or both edges of the BWP are unused when M is less than the first threshold number. In some implementations, the base station may define two equally-sized edge sub-BWPs, each edge sub-BWP including $(M+N_{RB}^{sub})/2$ resource blocks when the number of remaining resource blocks is less than the first threshold number.

Figure 14:
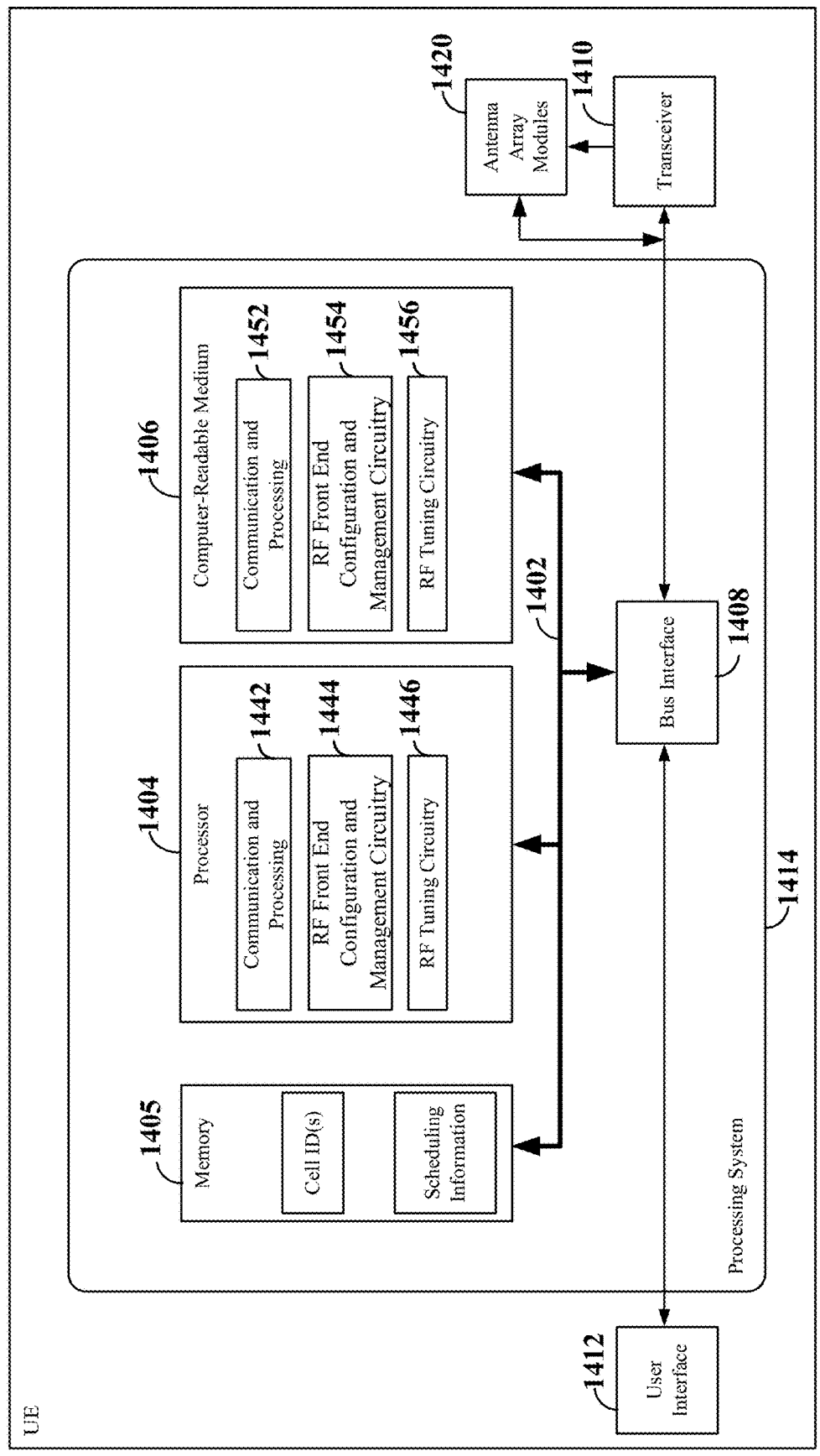
FIG. 14 is a block diagram illustrating an example of a hardware implementation for a UE employing a processing system according to some aspects.

FIG. 14 is a conceptual diagram illustrating an example of a hardware implementation for an exemplary user equipment (e.g., UE 1400) employing a processing system 1414. For example, the UE 1400 may be a UE as illustrated in any one or more of FIGS. 1 and 2. The processing system 1414 may be substantially the same as the processing system 1114 illustrated in FIG. 11, including a bus interface 1408, a bus 1402, memory 1405, a processor 1404, and a computer-readable medium 1406. Furthermore, the UE 1400 may include a user interface 1412 and a transceiver 1410 substantially similar to those described above in FIG. 11. In addition, the UE may further include one or more antenna modules 1420. An antenna module may include one or more antennas. In accordance with various aspects of the disclosure, an element, or any portion of an element, or any combination of elements may be implemented with the processing system 1414 that includes one or more processors 1404. That is, the processor 1404, as utilized in a UE 1400, may be used to implement any one or more of the processes described below.

In some aspects of the disclosure, the processor 1404 may include circuitry configured for various functions. For example, the processor 1404 may include communication and processing circuitry 1442 configured to communicate with a base station. In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 1442 may be configured to generate and transmit an uplink signal at a mmWave frequency or a sub-6 GHz frequency via the transceiver 1410 and antenna modules 1420. In addition, the communication and processing circuitry 1442 may be configured to receive and process a downlink signal at a mmWave frequency or a sub-6 GHz frequency via the antenna modules 1420 and the transceiver 1410.

The communication and processing circuitry 1442 may further be configured to transmit and receive mmWave relay signals to and from other UEs. In some examples, the mmWave relay signals may include synchronization signals, random access messages, beam reference signals (RSs), and/or relay communications. The communication and processing circuitry 1442 may further be configured to execute communication and processing software 1452 stored on the computer-readable medium 1406 to implement one or more functions described herein.

The processor 1404 may further include RF Front End configuration and management circuitry 1444, and RF tuning circuitry 1446. The RF Front End configuration and management circuitry 1444 may manage certain features and operational aspects of the transceiver 1410 and/or antenna modules 1420, including power amplifiers, low-noise amplifiers, switches, filters, phase management circuits, power trackers, tuners, antennas, and the like. The RF Front End configuration and management circuitry 1444 may be configured to operate in coordination with the communication and processing circuitry 1442 and the RF tuning circuitry 1446. For example, the RF Front End configuration and management circuitry 1444 may configure the transceiver 1410 to monitor receive and transmit signals in any of a number of frequency bands. The RF Front End configuration and management circuitry 1444 may support frequency hopping and may cooperate with the RF tuning circuitry 1446 to retune one or more components in the transceiver 1410 and/or in the antenna modules 1420.

In some examples, the RF Front End configuration and management circuitry 1444 may be configured to operate in coordination with the communication and processing circuitry 1442 and the RF tuning circuitry 1446 to configure the transceiver 14140 to communicate using a BWP comprising a portion of an operating bandwidth provided by a wireless communication network, receive a PDCCH in a first sub-BWP that is located at a first frequency within the BWP and that includes first resource blocks provided in the BWP, retune one or more radio frequency components of the wireless transceiver from the first frequency to a second frequency within the BWP, and receive a PDSCH scheduled by the PDCCH in a second sub-BWP that is located at the second frequency and that includes second resource blocks provided in the BWP. The one or more components of the radio frequency transceiver are retuned during a scheduling gap provided between the PDCCH and the PDSCH.

The RF Front End configuration and management circuitry 1444 may further be configured to execute RF Front End configuration and management circuitry 1454 stored on the computer-readable medium 1406 to implement one or more of the functions described herein. The RF tuning circuitry 1446 may further be configured to execute RF tuning circuitry 1456 stored on the computer-readable medium 1406 to implement one or more of the functions described herein.

Figure 15:
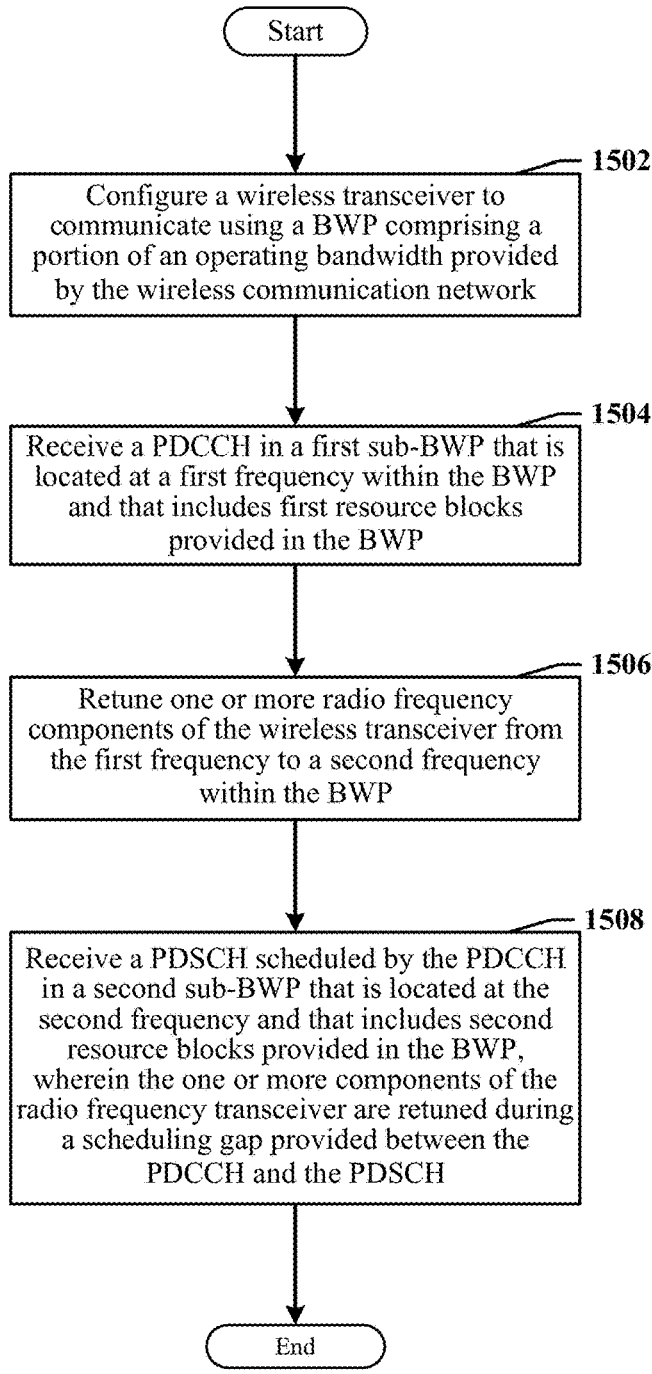
FIG. 15 is a flow chart of a method for a UE in accordance with certain aspects disclosed herein.

FIG. 15 is a flow chart 1500 of a method for wireless communication at a UE in a wireless communication network. The UE may be configured to implement frequency hopping between sub-BWPs in accordance with certain aspects disclosed herein. At block 1502, the UE may configure a wireless transceiver to communicate using a BWP that includes a portion of an operating bandwidth provided by the wireless communication network. At block 1504, the UE may receive a PDCCH in a first sub-BWP that is located at a first frequency within the BWP and that includes first resource blocks provided in the BWP. At block 1506, the UE may retune one or more radio frequency components of the wireless transceiver from the first frequency to a second frequency within the BWP. At block 1508, the UE may receive a PDSCH scheduled by the PDCCH in a second sub-BWP that is located at the second frequency and that includes second resource blocks provided in the BWP. The one or more components of the radio frequency transceiver may be retuned during a scheduling gap provided between the PDCCH and the PDSCH. The one or more radio frequency components of the wireless transceiver may include an antenna.

In one example, the scheduling gap covers an integer number (N+$N_{retuning}$) of symbols that includes at least a first number of symbols (N) associated with a processing time for the PDCCH, and a second number of symbols ($N_{retuning}$) associated with a time for the retuning.

In one example, the PDSCH conforms to physical downlink shared channel mapping type A defined by the 3GPP and the PDCCH and PDSCH are prohibited from being transmitted in a same slot. The scheduling gap may be provided as a slot offset that includes an integer number of slots. The integer number of slots ($K_{th,A}$) for PDSCH that complies with physical downlink shared channel mapping type A defined by the 3GPP may be different from the integer number of slots ($K_{th,B}$) for PDSCH that complies with physical downlink shared channel mapping type B defined by the 3GPP. In some instances, $K_{th,A}=K_{th,B}+1$.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 10 and 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a scheduling entity in a wireless communication network, the method comprising:
    configuring a portion of an operating bandwidth to serve as a bandwidth part (BWP) used for communicating with a user equipment (UE) over the wireless communication network;
    defining two or more sub-BWPs at different frequency locations within the BWP, each sub-BWP including resource blocks provided in the BWP;
    providing a scheduling gap when a frequency hop is scheduled between two or more sub-BWPs at the UE, wherein the scheduling gap accommodates radio frequency retuning at the UE;
    transmitting a physical downlink control channel (PDCCH) in a first sub-BWP; and
    transmitting a physical downlink shared channel (PDSCH) scheduled by the PDCCH with a preceding hop in a second sub-BWP the PDSCH commencing after the scheduling gap,
    wherein the scheduling gap is provided after the PDCCH and comprises a slot offset that includes an integer number of slots,
    wherein the PDSCH conforms to physical downlink shared channel mapping type A defined by the Third Generation Partnership Project (3GPP), and
    wherein the PDCCH and PDSCH are prohibited from being transmitted in a same slot.

2. The method of claim 1, wherein the scheduling gap includes an integer number of symbols.

3. The method of claim 2, further comprising:
    determining a first number of symbols (N) associated with a processing time for the PDCCH; and
    determining a second number of symbols ($N_{retuning}$) associated with a time for the radio frequency retuning at the UE, wherein the scheduling gap covers at least $N+N_{retuning}$ symbols.

4. The method of claim 1, wherein the integer number of slots ($K_{th,A}$) for PDSCH that complies with physical downlink shared channel mapping type A defined by the Third Generation Partnership Project (3GPP) is different from the integer number of slots ($K_{th,B}$) for PDSCH that complies with physical downlink shared channel mapping type B defined by the 3GPP.

5. The method of claim 1, wherein one or more symbols preceding a symbol that carries a demodulation reference signal (DMRS) are punctured.

6. The method of claim 1, wherein defining the two or more sub-BWPs comprises:
    determining a first number ($N_{RB}^{BWP}$) quantifying resource blocks in the BWP;
    determining a second number ($N_{RB}^{sub}$) quantifying resource blocks in each sub-BWP; and
    determining a third number (M) quantifying remaining resource blocks, where $M=N_{RB}^{BWP} \bmod N_{RB}^{sub}$,
    wherein M resource blocks located at one or both edges of the BWP are unused.

7. The method of claim 6, wherein defining the two or more sub-BWPs further comprises:
    determining a size of at least one sub-BWP located at an edge of the BWP that includes fewer than $N_{RB}^{sub}$ resource blocks when M equals or exceeds a first threshold number,
    wherein the M resource blocks located at the one or both edges of the BWP are unused when M is less than the first threshold number.

8. The method of claim 7, further comprising:
    defining two equally-sized edge sub-BWPs, each edge sub-BWP including $(M+N_{RB}^{sub})/2$ resource blocks when the number of remaining resource blocks is less than the first threshold number.

9. A scheduling entity in a wireless communication network, comprising:
    a wireless transceiver;
    a memory; and
    one or more processors communicatively coupled to the wireless transceiver and the memory, wherein the one or more processors are individually or collectively configured to cause the scheduling entity to:
        configure a portion of an operating bandwidth to serve as a bandwidth part (BWP) used for communicating with a user equipment (UE) over the wireless communication network;
        define two or more sub-BWPs at different frequency locations within the BWP, each sub-BWP including resource blocks provided in the BWP; and
        provide a scheduling gap when a frequency hop is scheduled between two or more sub-BWPs at the UE, wherein the scheduling gap accommodates radio frequency retuning at the UE;
        transmit a physical downlink control channel (PDCCH) in a first sub-BWP; and
        transmit a physical downlink shared channel (PDSCH) scheduled by the PDCCH with a preceding hop in a second sub-BWP the PDSCH commencing after the scheduling gap,
    wherein the scheduling gap is provided after the PDCCH and comprises a slot offset that includes an integer number of slots,
    wherein the PDSCH conforms to physical downlink shared channel mapping type A defined by the Third Generation Partnership Project (3GPP), and
    wherein the PDCCH and PDSCH are prohibited from being transmitted in a same slot.

10. The scheduling entity of claim 9, wherein the scheduling gap includes an integer number of symbols.

11. The scheduling entity of claim 10, wherein the one or more processors are individually or collectively configured to cause the scheduling entity to:
    determine a first number of symbols (N) associated with a processing time for the PDCCH; and
    determine a second number of symbols ($N_{retuning}$) associated with a time for the radio frequency retuning at the UE, wherein the scheduling gap covers at least $N+N_{retuning}$ symbols.

12. The scheduling entity of claim 9, wherein the integer number of slots ($K_{th,A}$) for PDSCH that complies with physical downlink shared channel mapping type A defined by the Third Generation Partnership Project (3GPP) is different from the integer number of slots ($K_{th,B}$) for PDSCH that complies with physical downlink shared channel mapping type B defined by the 3GPP.

13. The scheduling entity of claim 9, wherein one or more symbols preceding a symbol that carries a demodulation reference signal (DMRS) are punctured.

14. A scheduling entity in a wireless communication network, comprising:
    a wireless transceiver;
    a memory; and one or more processors communicatively coupled to the wireless transceiver and the memory, wherein the one or more processors are individually or collectively configured cause the scheduling entity to:
  configure a portion of an operating bandwidth to serve as a bandwidth part (BWP) used for communicating with a user equipment (UE) over the wireless communication network;
  define two or more sub-BWPs at different frequency locations within the BWP, each sub-BWP including resource blocks provided in the BWP;
  provide a scheduling gap when a frequency hop is scheduled between two or more sub-BWPs at the UE, wherein the scheduling gap accommodates radio frequency retuning at the UE;
  determine a first number ($N_{RB}^{BWP}$) quantifying resource blocks in the BWP;
  determine a second number ($N_{RB}^{sub}$) quantifying resource blocks in each sub-BWP; and
  determine a third number (M) quantifying remaining resource blocks, where $M = N_{RB}^{BWP} \mod N_{RB}^{sub}$,
  wherein M resource blocks located at one or both edges of the BWP are unused.

15. The scheduling entity of claim 9, wherein the one or more processors are individually or collectively configured to cause the scheduling entity to:
  determine a size of at least one sub-BWP located at an edge of the BWP that includes fewer than $N_{RB}^{sub}$ resource blocks when M equals or exceeds a first threshold number,
  wherein the M resource blocks located at the one or both edges of the BWP are unused when M is less than the first threshold number.

16. The scheduling entity of claim 15, wherein the one or more processors are individually or collectively configured to cause the scheduling entity to:
  define two equally-sized edge sub-BWPs, each edge sub-BWP including $(M+N_{RB}^{sub})/2$ resource blocks when the number of remaining resource blocks is less than the first threshold number.

17. A scheduled entity, comprising:
  a wireless transceiver;
  a memory; and
  one or more processors communicatively coupled to the wireless transceiver and the memory, wherein the one or more processors are individually or collectively configured to cause the scheduled entity to:
    configure the wireless transceiver to communicate using a bandwidth part (BWP) comprising a portion of an operating bandwidth provided by a wireless communication network;
    receive a physical downlink control channel (PDCCH) in a first sub-BWP that is located at a first frequency within the BWP and that includes first resource blocks provided in the BWP;
    retune one or more radio frequency components of the wireless transceiver from the first frequency to a second frequency within the BWP; and
    receive a physical downlink shared channel (PDSCH) scheduled by the PDCCH in a second sub-BWP that is located at the second frequency and that includes second resource blocks provided in the BWP,
  wherein the one or more components of the wireless transceiver are retuned during a scheduling gap provided between the PDCCH and the PDSCH,
  wherein the PDSCH conforms to physical downlink shared channel mapping type A defined by the Third Generation Partnership Project (3GPP), and
  wherein the PDCCH and PDSCH are prohibited from being transmitted in a same slot.

18. The scheduled entity of claim 17, wherein the scheduling gap covers an integer number ($N+N_{retuning}$) of symbols that comprises at least a first number of symbols (N) associated with a processing time for the PDCCH, and a second number of symbols ($N_{retuning}$) associated with a time for the retuning.

19. The scheduled entity of claim 17, wherein the scheduling gap comprises a slot offset that includes an integer number of slots, and wherein the integer number of slots ($K_{th,A}$) for PDSCH that complies with physical downlink shared channel mapping type A defined by the Third Generation Partnership Project (3GPP) is different from the integer number of slots ($K_{th,B}$) for PDSCH that complies with physical downlink shared channel mapping type B defined by the 3GPP.

* * * * *